US012763053B2

(12) United States Patent
Watanabe

(10) Patent No.: US 12,763,053 B2
(45) Date of Patent: Oct. 13, 2026

(54) PERCUSSION INSTRUMENT, BOTTOM FRAME REINFORCEMENT METHOD AND PERCUSSION INSTRUMENT MANUFACTURING METHOD

(71) Applicant: Roland Corporation, Shizuoka (JP)

(72) Inventor: Ryoken Watanabe, Shizuoka (JP)

(73) Assignee: Roland Corporation, Shizuoka (JP)

( * ) Notice: Subject to any disclaimer, the term of this patent is extended or adjusted under 35 U.S.C. 154(b) by 239 days.

(21) Appl. No.: 18/748,042

(22) Filed: Jun. 19, 2024

(65) Prior Publication Data

US 2025/0006165 A1 Jan. 2, 2025

(30) Foreign Application Priority Data

Jun. 29, 2023 (JP) ................................. 2023-107133

(51) Int. Cl.
*G10H 3/14* (2006.01)
*G10D 13/10* (2020.01)
*G10D 13/24* (2020.01)

(52) U.S. Cl.
CPC ............. *G10H 3/146* (2013.01); *G10D 13/24* (2020.02); *G10D 13/26* (2020.02); *G10H 2230/301* (2013.01)

(58) Field of Classification Search
CPC .. G10H 3/146; G10H 2230/301; G10D 13/24; G10D 13/26
USPC ........................................................ 84/411 R
See application file for complete search history.

(56) References Cited

U.S. PATENT DOCUMENTS 11,417,304 B2 * 8/2022 Shemesh ................ G10D 13/02
D1,092,608 S * 9/2025 Ohmae .......................... D17/22
2004/0118269 A1 * 6/2004 Yoshino ................. G10H 3/146 84/723
2013/0180388 A1 * 7/2013 Mori ........................ G10H 3/14 84/723

(Continued)

FOREIGN PATENT DOCUMENTS

CN 114945976 A * 8/2022 ........... G10H 1/0008
DE 102014005510 10/2015

(Continued)

OTHER PUBLICATIONS

"Office Action of Europe Counterpart Application", issued on Jun. 18, 2025, pp. 1-5.

(Continued)

*Primary Examiner* — Christina M Schreiber
(74) *Attorney, Agent, or Firm* — JCIPRNET

(57) ABSTRACT

Concave parts 24*a* to 24*c* formed on lower surfaces of radial parts 21 are formed in a groove shape extending from the side of a central part 20 of a bottom frame 2 toward an outer peripheral side in a radial direction. Accordingly, the formation of ribs in the radial parts 21 of the bottom frame 2 is not required, or the number of ribs that are formed can be reduced, while the rigidity of the bottom frame 2 (radial parts 21) can be secured by the concave parts 24*a*. Thus, even in the case where the bottom frame 2 is formed by using resin molding, the sink marks generated in the radial parts 21 can be suppressed. Therefore, the bottom frame 2 can be reinforced by the concave parts 24*a* to 24*c*, while the appearance of the percussion instrument 100 can be improved.

12 Claims, 8 Drawing Sheets

(56) References Cited

U.S. PATENT DOCUMENTS

| | | | | |
|---|---|---|---|---|
| 2015/0027301 | A1* | 1/2015 | Shih | G10H 3/12 84/730 |
| 2018/0061386 | A1* | 3/2018 | Takasaki | G10H 3/143 |
| 2019/0392792 | A1* | 12/2019 | Green | G10D 13/02 |
| 2020/0327872 | A1* | 10/2020 | Shemesh | G10H 3/146 |
| 2023/0090680 | A1* | 3/2023 | Inoue | G10H 3/146 84/604 |
| 2025/0006156 | A1* | 1/2025 | Watanabe | G10D 13/02 |
| 2025/0006163 | A1* | 1/2025 | Watanabe | G10D 13/26 |
| 2025/0006164 | A1* | 1/2025 | Watanabe | G10H 3/146 |
| 2025/0006165 | A1* | 1/2025 | Watanabe | G10H 3/146 |

FOREIGN PATENT DOCUMENTS

| | | | | |
|---|---|---|---|---|
| DE | 102014005510 | A1 * | 10/2015 | G10H 3/146 |
| DE | 202015105441 | | 10/2015 | |
| DE | 202015105441 | U1 * | 10/2015 | G10H 3/146 |
| EP | 1837860 | A2 * | 9/2007 | G10H 3/146 |
| JP | 2004198657 | | 7/2004 | |
| JP | 2004198657 | A * | 7/2004 | G10H 3/146 |
| JP | 2007249140 | A * | 9/2007 | |
| JP | 2014130373 | | 7/2014 | |
| JP | 2014130373 | A * | 7/2014 | |
| JP | 2016177124 | | 10/2016 | |
| JP | 2016177124 | A * | 10/2016 | |
| JP | 2017102278 | | 6/2017 | |
| JP | 2017102278 | A * | 6/2017 | |
| JP | 2019148623 | | 9/2019 | |
| JP | 2019148623 | A * | 9/2019 | G10D 13/02 |
| JP | 2021105702 | | 7/2021 | |
| JP | 2021105702 | A * | 7/2021 | |

OTHER PUBLICATIONS

"Notice of Reasons for Refusal of Japan Counterpart Application", issued on Feb. 12, 2025, with English translation thereof, pp. 1-6.
"Search Report of Europe Counterpart Application", issued on Nov. 22, 2024, pp. 1-8.

* cited by examiner

PERCUSSION INSTRUMENT, BOTTOM FRAME REINFORCEMENT METHOD AND PERCUSSION INSTRUMENT MANUFACTURING METHOD

CROSS-REFERENCE TO RELATED APPLICATION

This application claims the priority benefit of Japan application serial no. 2023-107133, filed on Jun. 29, 2023. The entirety of the above-mentioned patent application is hereby incorporated by reference herein and made a part of this specification.

BACKGROUND

Technical Field

The disclosure relates to a percussion instrument and a bottom frame reinforcement method, and particularly relates to a percussion instrument and a bottom frame reinforcement method capable of improving the appearance while reinforcing a radial part of a bottom frame.

Description of Related Art

For example, Patent Document 1 discloses a technique for forming an opening part substantially in a triangular shape in a linking part 4c of a sensor frame 4 (bottom frame) forming a bottom surface of a housing of a percussion instrument. Since multiple opening parts are arranged in the peripheral direction of the sensor frame 4, the vibration at the time when a head 5 is percussed may be easily released to the outside via the opening parts. Accordingly, since it is possible to suppress the vibration at the time when the head 5 is percussed from reverberating within the housing, the volume generated when the head 5 is percussed can be reduced.

Meanwhile, when multiple opening parts are formed in the sensor frame 4, the rigidity of the sensor frame 4 may be reduced easily. In order to secure the rigidity of the sensor frame 4, it is considered to form reinforcement ribs at portions (referred to as "radial parts" in the following) extending radially between the opening parts arranged in the peripheral direction. A rib 34 that reinforces a frame 3 (bottom frame) of Patent Document 2, for example, is exemplified as the reinforcement rib.

PRIOR ART DOCUMENT(S)

Patent Document(s)

[Patent Document 1] Japanese Laid-open No. 2004-198657 (see, for example, para. 0044, 0048, FIG. 2).

[Patent Document 2] Japanese Laid-open No. 2021-105702 (see, for example, para. 0044, FIGS. 1 and 2).

However, in the configuration in which multiple ribs are formed on the upper surfaces of the radial parts, if the bottom frame is formed by using resin, sink marks may occur on the lower surfaces of the radial parts on the side opposite to the ribs. Thus, the appearance may deteriorate easily.

The disclosure provides a percussion instrument and a bottom frame reinforcement method capable of improving the appearance while reinforcing the radial parts of the bottom frame.

SUMMARY

A percussion instrument according to an aspect of the disclosure includes: a head, forming a percussion surface; a housing, having a body part in a cylindrical shape having an opening on an upper end side covered by the head; and a bottom frame, forming a bottom surface of the housing. The bottom frame includes: a central part, forming a central portion of the bottom frame; a plurality of radial parts, radially extending from the central part toward an outer edge side of the housing; and an outer peripheral part, connecting outer edges of the radial parts in a peripheral direction. A concave part extending from a side of the central part toward a side of the outer peripheral part is formed on a lower surface of the radial part.

Another aspect of the disclosure provides a bottom frame reinforcement method, which is a bottom frame reinforcement method in a percussion instrument. The percussion instrument includes: a head, forming a percussion surface; a housing, having a body part in a cylindrical shape having an opening on an upper end side covered by the head; and a bottom frame, forming a bottom surface of the housing. The bottom frame includes: a central part, forming a central portion of the bottom frame; a plurality of radial parts, radially extending from the central part toward an outer edge side of the housing; and an outer peripheral part, connecting outer edges of the radial parts in a peripheral direction. The bottom frame reinforcement method includes: forming a concave part extending from a side of the central part toward a side of the outer peripheral part on a lower surface of the radial part.

Yet another aspect of the disclosure provides a percussion instrument manufacturing method. The percussion instrument manufacturing method includes: providing a head forming a percussion surface; providing a housing having a body part in a cylindrical shape having an opening on an upper end side covered by the head; and providing a bottom frame, forming a bottom surface of the housing. The bottom frame comprises: a central part, forming a central portion of the bottom frame; a plurality of radial parts, radially extending from the central part toward an outer edge side of the housing; and an outer peripheral part, connecting outer edges of the radial parts in a peripheral direction, and a concave part extending from a side of the central part toward a side of the outer peripheral part is formed on a lower surface of the radial part.

DESCRIPTION OF THE EMBODIMENTS

Figure 1:
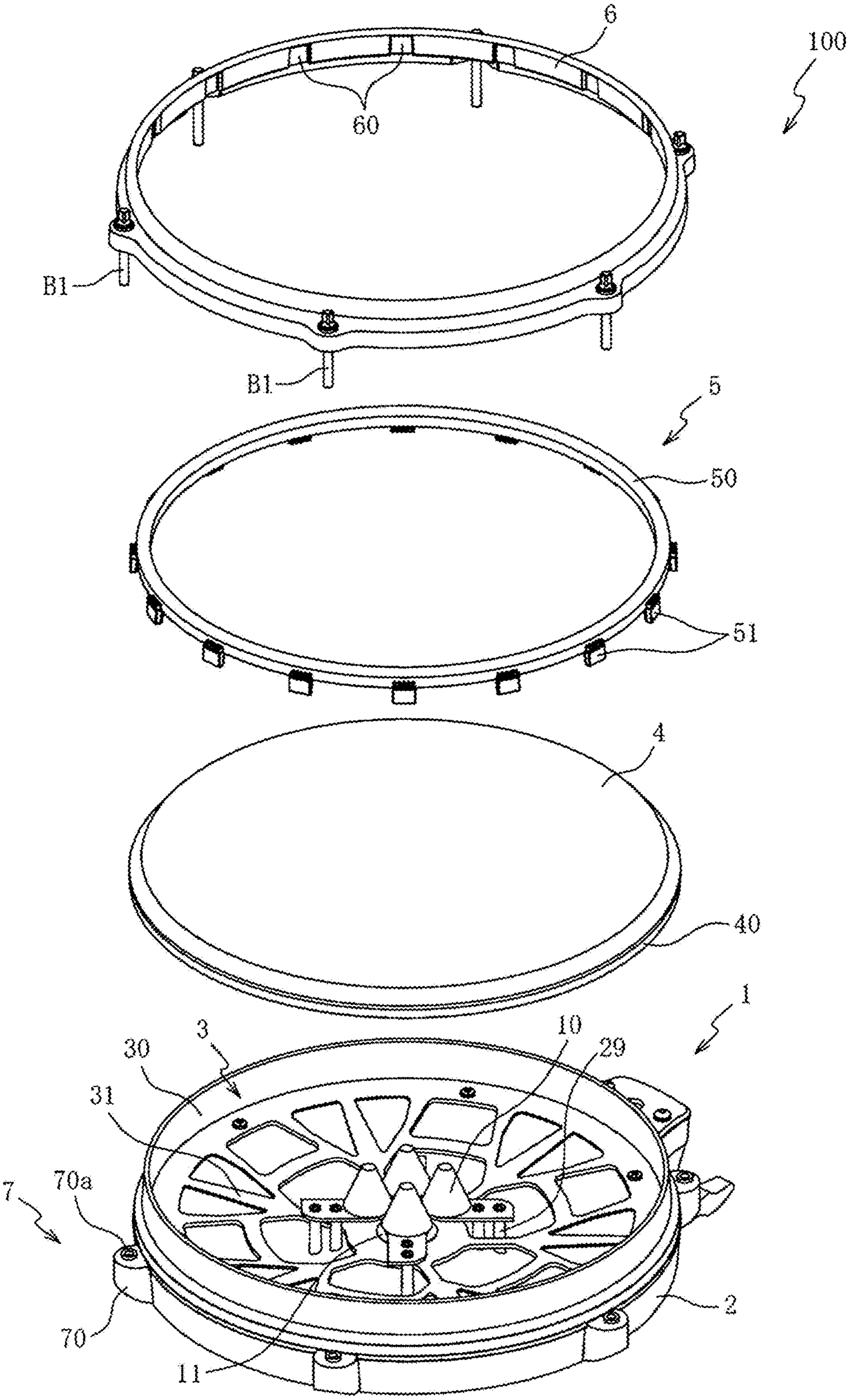
FIG. 1 is an exploded perspective view illustrating a percussion instrument according to a first embodiment.

In the following, the exemplary embodiment are described with reference to the drawings. Firstly, referring to FIG. 1, the overall configuration of a percussion instrument 100 of a first embodiment is described. FIG. 1 is an exploded perspective view illustrating the percussion instrument 100 according to the first embodiment. In FIG. 1, for the simplicity of the drawing, only a protrusion part 29 (the portion supporting a head sensor 10) to be described afterwards is shown among the internal structure of a bottom frame 2 hidden in a support part 31 of a top frame 3.

As shown in FIG. 1, the percussion instrument 100 is an electronic percussion instrument simulating an acoustic drum, and includes a housing 1 forming the body portion of the percussion instrument 100. The housing 1 includes a bottom frame 2 and a top frame 3. The bottom frame 2 is in a substantially disk shape and forms a bottom surface of the housing 1, and the top frame 3 is overlapped with the bottom frame 2. The bottom frame 2 and the top frame 3 are frames supporting a head sensor 10 or a rim sensor 11. The support structures of the respective sensors 10, 11 are described in the following with reference to FIGS. 5 and 6.

The top frame 3 includes a cylindrical body part 30 and a support part 31 supporting the rim sensor 11 on the inner peripheral side of the body part 30. The body part 30 and the support part 31 are integrally formed by using a resin material. In the following description, a direction orthogonal to the axis of the cylindrical body part 30 is referred to as radial direction, and a direction around the axis of the body part 30 is referred to as peripheral direction.

The opening portion of the body part 30 on the upper surface side is covered by a membrane-like head 4. Thus, the upper surface of the head 4 serves as a percussion surface of the percussion instrument 100. The head 4 is formed in a disk shape by using a mesh woven by synthetic fibers, and a head frame 40 in an annular shape is fixed to the outer edge of the head 4.

The head frame 40 is formed by using a resin material, and the head 4 and the head frame 40 are integrally formed through die-molding. Nevertheless, the head frame 40 may also be formed by using a material (e.g., metal, wood, etc.) other than resin, and the head frame 40 is bonded to the head 4 through adhesion etc.

The head 4 is installed, together with an annular rim 5, to the housing 1 by using a hoop 6. In the installation state, the entire periphery of the outer edge portion of the head 4 is surrounded by the rim 5. The rim 5 is a component that allows a player to perform a rim shot, in which the player hits the head 4 and the rim 5 at the same time, or a rim-only shot, in which the player hits only the rim 5. The rim 5 includes a percussed part 50 and a sandwiched part 51. The percussed part 50 is in an annular shape and receives percussion by the player. The sandwiched part 51 is in a substantially rectangular parallelepiped shape formed on the outer peripheral surface of the percussed part 50. The percussed part 50 and the sandwiched part 51 are integrally formed by using a resin material (rubber, elastomer, etc.) softer than the hoop 6.

Multiple sandwiched parts 51 (at sixteen positions in the embodiment) are formed at equal (or unequal) intervals in the peripheral direction of the percussion part 50, and multiple accommodation parts 60 are formed on the inner peripheral surface of the hoop 6 at positions corresponding to the sandwiched parts 51. The accommodation part 60 is recessed in a shape corresponding to the sandwiched part 51. When the rim 5 is installed to the upper surface of the head 4, the sandwiched part 51 is accommodated in the accommodation part 60. In addition, a conventional configuration may be adopted for the installation structure of the rim 5, so detailed description in this regard is omitted. As a conventional configuration, the installation structure of the rim 5 of Japanese Laid-open No. 2019-148623 serves as an example.

Through holes 61 (see FIG. 4A) for insertion of tension bolts B1 are formed at equal intervals along the peripheral direction in the hoop 6. In the housing 1, multiple lugs 7 (at six positions in the embodiment) for fastening (screw-in) the tension bolts B1 are provided at equal intervals in the peripheral direction.

The lug 7 includes a fastening part 70 disposed on the outer peripheral side with respect to the body part 30 of the top frame 3, and, in the fastening part 70, a screw hole 70*a* extending in the upper-lower direction is formed. In a state in which the head frame 40 of the head 4 is hooked to the hoop 6 while the sandwiched parts 51 of the rim 5 are fit into the accommodation parts 60 of the hoop 6, a tensile force is applied to the head 4 by fastening the tension bolts B1 to the screw holes 70*a* of the lugs 7. In the following, the detailed configuration of the housing 1 is described with reference to FIGS. 2 and 3.

Figure 2A:
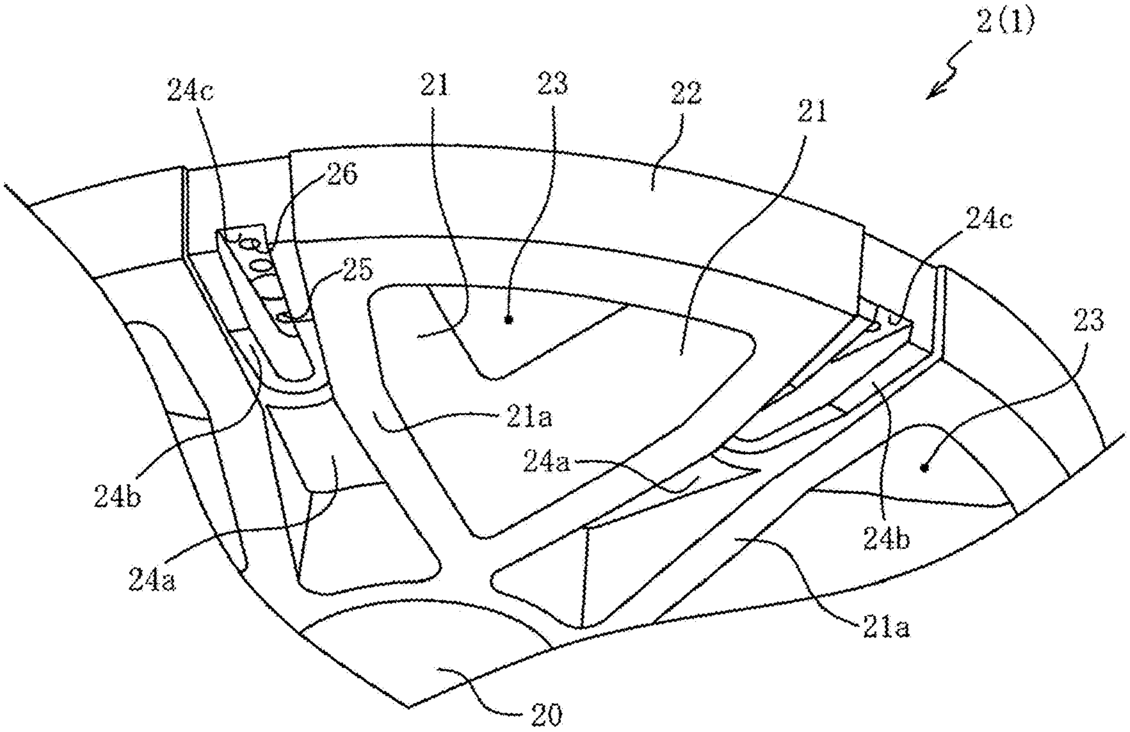
FIG. 2A is a perspective view illustrating a bottom frame when viewed from a lower side.
Figure 2B:
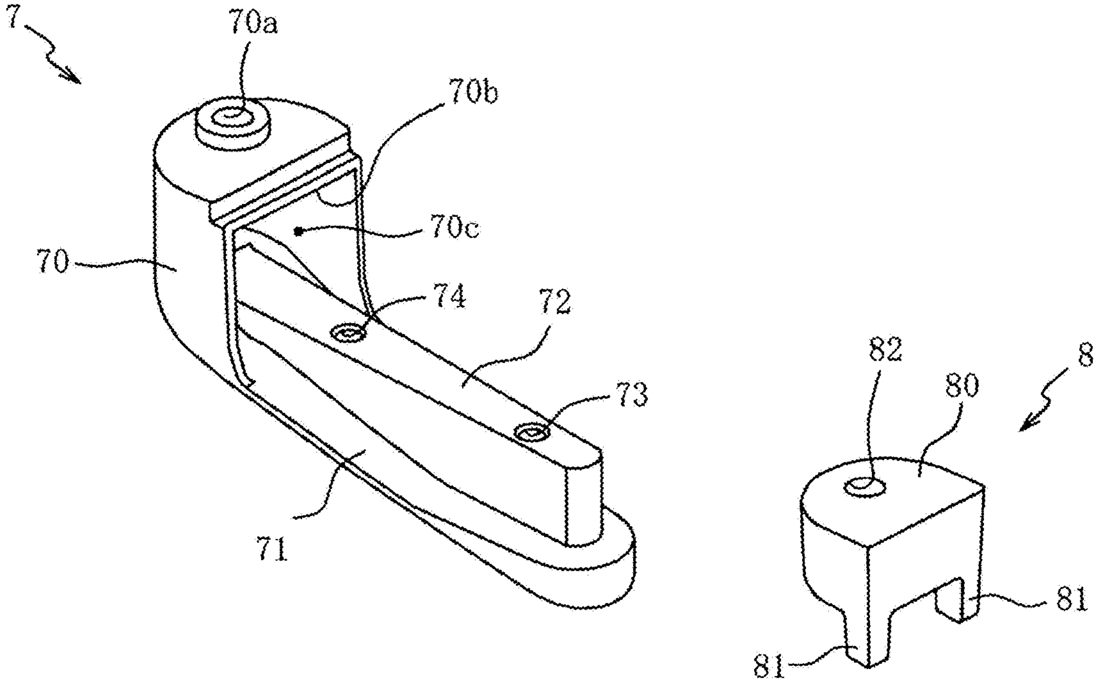
FIG. 2B is a perspective view illustrating a lug and a loosening stopper.
Figure 3:
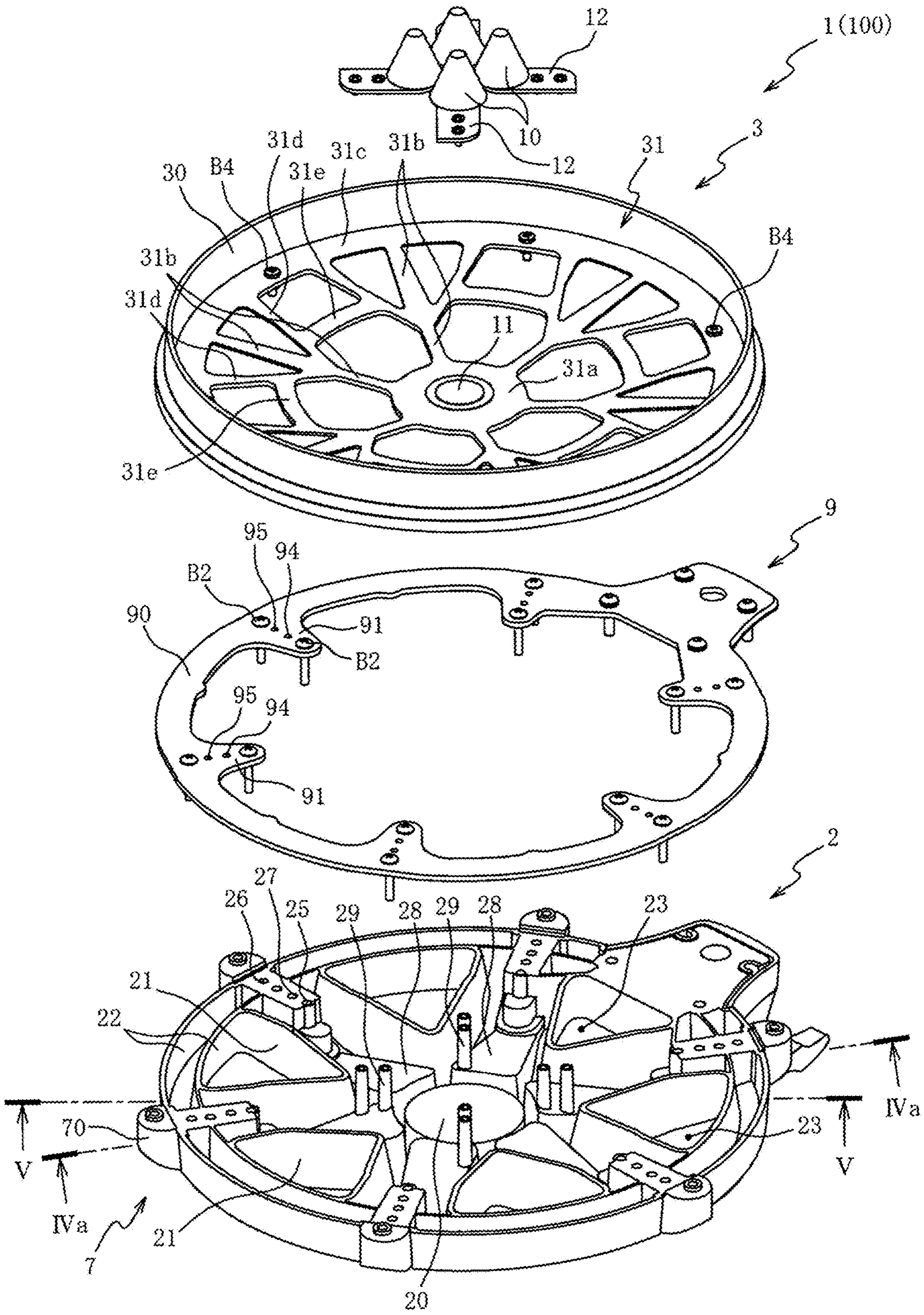
FIG. 3 is an exploded perspective view illustrating a housing of the percussion instrument.

FIG. 2A is a perspective view illustrating the bottom frame 2 when viewed from a lower side, and FIG. 2B is a perspective view illustrating the lug 7 and a loosening stopper 8. FIG. 3 is an exploded perspective view illustrating the housing 1 of the percussion instrument 100.

As shown in FIGS. 2 and 3, the bottom frame 2 of the housing 1 includes a central part 20, multiple radial parts 21, and an outer peripheral part 22. The central part 20 is in a circular shape (substantially disk shape) forming the central portion of the bottom frame 2. The radial parts 21 extend radially from the central part 20. The outer peripheral part 22 is in an annular shape connecting the outer edges of the radial parts 21. The central part 20, the radial parts 21, and the outer peripheral part 22 are integrally formed by using a resin material.

The central part 20 is provided in a region including the axis of the body part 30. While multiple concave parts (plate-like ribs defining the central part 20), electronic components, such as a substrate, etc., are provided in the central part 20, the concave parts and the electronic components are not shown in FIG. 2 for the simplicity of illustration.

The radial parts 21 extend radially from the central part 20 toward the outer peripheral side. Since multiple (six in the embodiment) radial parts 21 are arranged at equal intervals in the peripheral direction, multiple substantially triangular sound emission holes 23 (at six positions in the embodiment) penetrating through the bottom frame 2 in the upper-lower direction are formed among the radial parts 21.

Although the configuration in which such sound emission holes 23 are formed is conventional (see, for example, Japanese Laid-open No. 2004-198657), when multiple sound emission holes 23 are formed in the bottom frame 2, the vibration at the time of percussion to the head 4 (sec FIG. 1) is easily emitted to the outside via the sound emission holes 23, and the rigidity of the bottom frame 2 may decrease. Comparatively, in the embodiment, concave parts 24*a* to 24*c* for reinforcing the bottom frame 2 are formed in the radial parts 21 (see FIG. 2). The concave parts 24*a* to 24*c* are parts for fixing the lugs 7 (sec FIG. 2B).

The concave parts 24*a* to 24*c* formed on the lower surfaces of the radial parts 21, are formed in a groove shape extending from the side of the central part 20 of the bottom frame 2 to the outer peripheral side (along the radial direction). Accordingly, regarding the radial part 21 of the bottom frame 2, the formation of a rib (e.g., a rib 34 in Japanese Laid-open No. 2021-105702) in the conventional art is not required, or the number of ribs that are formed can be reduced, while the rigidity of the bottom frame 2 (the radial parts 21) can be secured by the concave parts 24*a* to 24*c*. Thus, even in the case where the bottom frame 2 is formed by using resin molding, the sink marks generated in the radial parts 21 can be suppressed. Therefore, the bottom frame 2 can be reinforced by the concave parts 24*a* to 24*c*, while the appearance of the percussion instrument 100 can be improved.

The concave part 24 is a recess from the side of the central part 20 toward the outer peripheral side. The concave part 24*b* is a recess formed to be continuous with an end on the outer peripheral side of the concave part 24*a*. The concave parts 24*a*, 24*b* are formed in a region including the center of the radial direction 21 in the peripheral direction. In the region in which the concave part 24*a* is formed, the width dimension of the radial part 21 in the peripheral direction (the thickness of the radial part 21 in the peripheral direction) is formed to gradually decrease toward the concave part 24*b*. In addition, in the region in which the concave part 24*b* (the concave part 24*c*) is formed, the width dimension of the radial part 21 in the peripheral direction is formed to increase gradually toward the outer peripheral side.

Comparatively, the width dimension of the concave part 24*a* in the peripheral direction (the opening width of the concave part 24*a* in the peripheral direction) is also formed to decrease gradually toward the concave part 24*b*, and the width dimension of the concave part 24*b* in the same direction is formed to increase gradually toward the outer peripheral side. Accordingly, the rigidity of the radial part 21 can be increased uniformly along the longitudinal direction (the region where each concave part 24*a*, 24*b* is formed) thereof. In addition, with the width dimensions of the concave parts 24*a*, 24*b* changing similarly in accordance with the change of the width dimension of the radial part 21, the appearance of the percussion instrument 100 can be improved.

The bottom surface of the concave part 24*a* (the surface facing the lower side) is a planar surface (see FIG. 4A) that is inclined in a descending manner toward the outer peripheral side. The bottom surface 21*a* of the radial part 21 is a curved surface (see FIG. 4A) that is inclined to rise gradually toward the outer peripheral side. Accordingly, the depth of the concave part 24*a* with respect to the bottom surface 21*a* of the radial part 21 is formed to decrease (i.e., becoming shallow) gradually from the side of the central part 20 toward the outer peripheral side. In the following, the depths of the concave parts 24*a* to 24*c* with respect to the bottom surface 21*a* of the radial part 21.

The depth of the inner edge portion of the concave part 24*b* (the end on the inner peripheral side) is formed to be greater than the depth of the outer edge portion of the concave part 24*a* (the end of the outer peripheral side), and a stepped difference is formed between the boundary portion (connection portion) between the concave part 24*a* and the concave part 24*b*. By forming such stepped difference, the rigidity of the radial part 21 can be effectively increased.

The bottom surface of the concave part 24*b* is formed by a horizontal surface and an inclined surface. The horizontal surface extends from the inner edge of the concave part 24*b* toward the outer edge side. The inclined surface is connected with the outer edge of the horizontal surface and inclined upward toward the outer peripheral side. The depth of the concave part 24*b* gradually decreases from the inner peripheral side toward the outer peripheral side.

The inner edge of the concave part 24*c* is located on the outer peripheral side with respect to the inner edge of the concave part 24*b*. The concave part 24*c* is formed in a region including the peripheral center of the bottom surface of the concave part 24*b*. That is, since the concave part 24*c* is a groove recessed deeper than the bottom surface of the concave part 24*b*, the stepped difference formed by the concave parts 24*b*, 24*c* can further effectively facilitate the rigidity of the radial part 21.

Both of the concave part 24*b* and the concave part 24*c* extend to the outer edge of the bottom frame 2, and the bottom parts 24*b*, 24*c* are respectively fixed by using the lug 7.

The lug 7 includes a lower surface part 71 and a fixed part 72. The lower surface part 71 forms a lower surface of the lug 7 by extending from the lower end of the fastening part 70 to the inner peripheral side. The fixed part 72 is fixed to the bottom frame 2 by rising from the lower surface part 71. The fastening part 70, the lower surface part 71, and the fixed part 72 are integrally formed by using metal.

In the fastening part 70, a cavity 70*c* having an opening 70*b* is formed on the inner peripheral side (inner peripheral surface) of the fastening part 70, and the screw hole 70*a* is linked with the cavity 70*c*. The lower surface part 71 of the lug 7 is formed in a plate shape extending from the lower edge of the fastening part 70 (cavity 70*c*) toward the inner peripheral side, and the fixed part 72 protrudes upward from the region including the center of the lower surface part 71 in the peripheral direction. In other words, the lower surface part 71 projects like a flange from the side surface of the fixed part 72 (surface facing the peripheral direction) and the lower end of the inner peripheral surface.

In the cavity 70*c* of the fastening part 70, the loosening stopper 8 is inserted to prevent the tension bolt B1 from loosening. The loosening stopper 8 includes a body part 80 and a pair of leg parts 81. The body part 80 is in a shape (substantially semi-cylindrical shape) corresponding to the internal space of the cavity 70*c* of the fastening part 70. The leg parts 81 protrude downward from the lower surface of the body part 80. The body part 80 and the leg part 81 are integrally formed by using a resin material.

A screw hole 82 extending in the upper-lower direction is formed in the body part 80. Therefore, in the state in which the loosening stopper 8 is inserted into the cavity 70*c*, by fastening the tension bolt B1 to the screw hole 70*a* of the fastening part 70, the tension bolt B1 is also fastened into the screw hole 82 of the loosening stopper 8 (see FIG. 4A for the state in which the tension bolt B1 is fastened to the loosening stopper 8).

The fixed part 72 is formed in a substantially rectangular parallelepiped shape in which the dimension in the radial direction is longer than the dimension in the peripheral direction. The fixed part 72 in the substantially rectangular parallelepiped shape extending in the radial direction extends until into the cavity 70*c* of the fastening part 70. In the state in which the body part 80 of the loosening stopper 8 is inserted into the cavity 70*c*, the pair of leg part 81 spaced apart at an interval in the peripheral direction are disposed to sandwich the fixed part 72. Accordingly, even if the loosening stopper 8 is about to rotate when the tension bolt B1 is fastened to the screw hole 82, such rotation is limited with the pair of leg parts 81 and the fixed part 72 being hooked.

In this way, with the pair of leg parts 81 being hooked to the fixed part 72 extending into the cavity 70*c*, the rotation of the loosening stopper 8 can be limited by using the fixed part 72. Moreover, in the state in which the pair of leg parts 81 are hooked to the fixed part 72 (the body part 80 is placed on the fixed part 72), with the loosening stopper 8 being slided to the side of the cavity 70*c*, the insertion of the loosening stopper 8 toward the cavity 70*c* can be guided by the fixed part 72*c*. Thus, the operability of the process of assembling the lugs 7 can be facilitated.

The outer shape (upper and side surfaces) of the lower surface part 71 is formed in a shape matching the bottom surface and the side surface (surface surrounding the bottom surface) of the concave part 24*b*, and the outer shape of the fixed part 72 is also similarly formed in a shape matching the concave part 24*c*. A pair of screw holes 73, 74 arranged in the radial direction (the longitudinal direction of the fixed part 72) are formed in the fixed part of the lug 7. The pair of screw holes 73, 74 are provided to fix the lug 7 to the lower surface of the bottom frame 2. At the time of fixing the lug 7 to the bottom frame 2, the fixed part 72 and the lower surface part 71 of the lug 7 are fit into the concave part 24*b* and the concave part 24*c*.

In the state in which the lug 7 is fit into the concave part 24*b* and the concave part 24*c*, the concave part 24*b* and the concave part 24*c* are covered by the lug 7, whereas the concave part 24*a* is exposed to the lower surface side of the bottom frame 2 without being covered by the lug 7. In this case, when a rib (a plate-shaped wall extending in the peripheral direction) dividing the concave part 24*a* is formed, for example, the rigidity of the radial part 21 is increased, but the appearance deteriorates as the rib is exposed to the lower surface side of the percussion instrument 100 to deteriorate the appearance.

Comparatively, in the embodiment, the concave part 24*a* is formed like one groove continuous in the radial direction. That is, instead of forming the rib in the concave part 24*a*, the radial part 21 is reinforced by using the stepped difference generated by forming the respective concave parts 24*a* to 24*c*. Accordingly, the rigidity of the bottom frame 2 is ensured, and the appearance of the percussion instrument 100 can be improved.

Figure 4A:
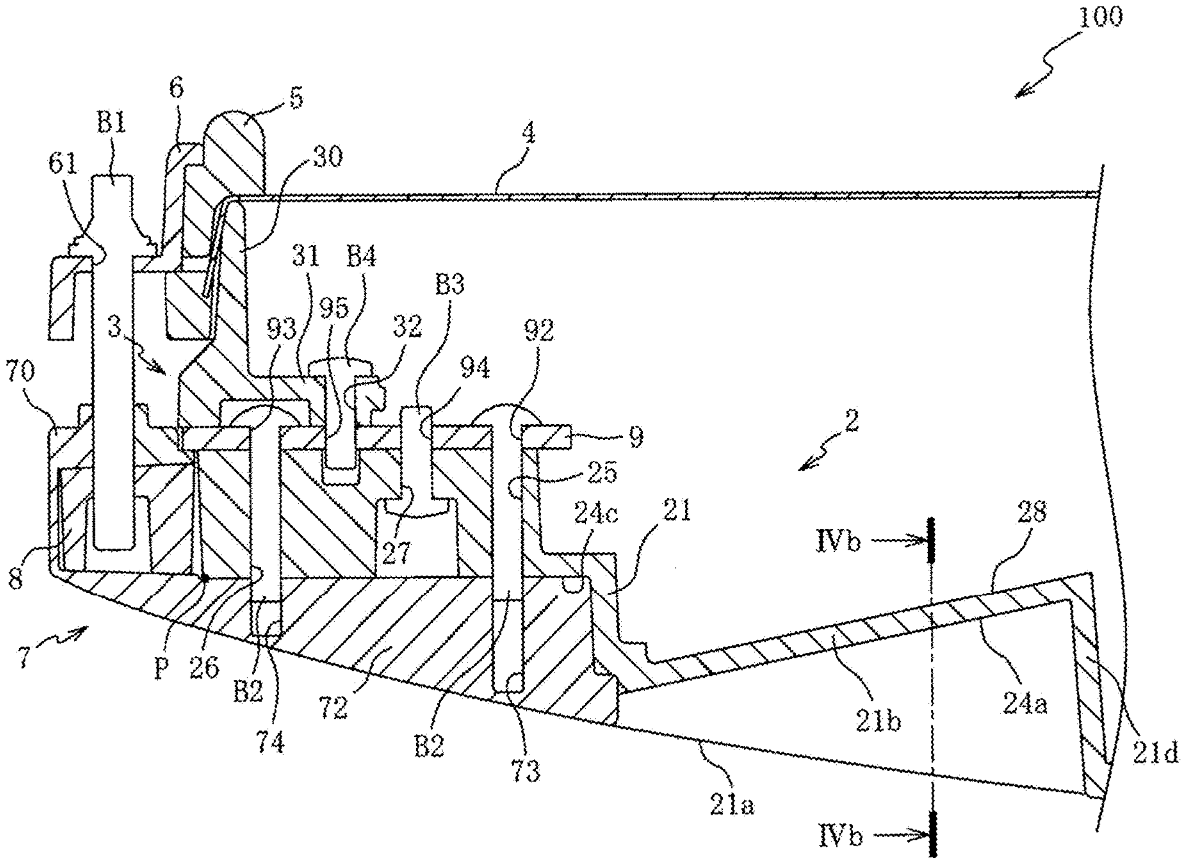
FIG. 4A is a partially enlarged cross-sectional view of the percussion instrument taken along a line IVa-IVa of FIG. 3.
Figure 4B:
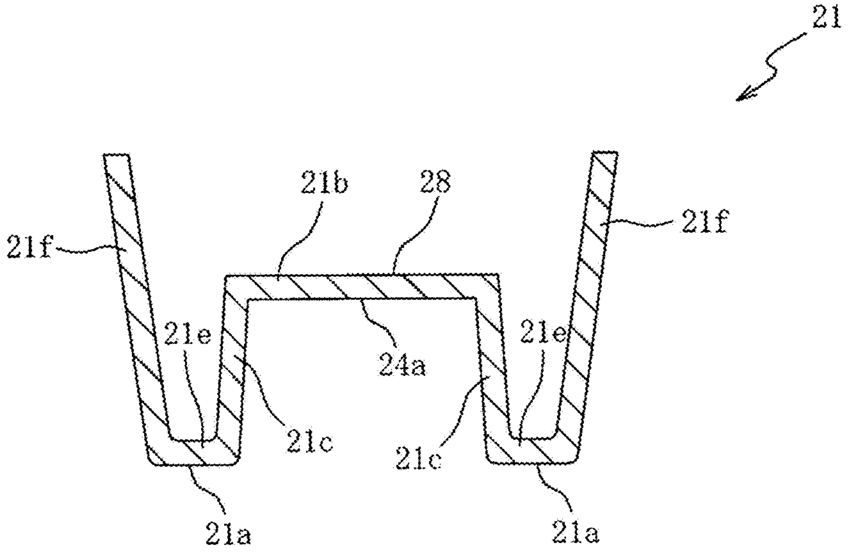
FIG. 4B is a cross-sectional view of a radial part taken along a line IVb-IVb of FIG. 4A.

Then, with reference to FIGS. 3 and 4, the detailed configuration of the housing 1 including the installation structure of the lug 7 is described. FIG. 4A is a partially enlarged cross-sectional view of the percussion instrument 100 taken along a line IVa-IVa of FIG. 3, and FIG. 4B is a cross-sectional view of a radial part 21 taken along a line IVb-IVb of FIG. 4A. FIG. 4A illustrates an end surface of a cut-off part cut off at a plane including the axis of the body part 30 and the tension bolt B1, and FIG. 4B illustrates an end surface of a cut-off part of the radial part 21. However, in FIG. 4A, the bottom surface 21*a* of the radial part 21 located behind (back side in a direction perpendicular to the paper surface) the cut-off surface is shown by using a solid line.

As shown in FIGS. 3 and 4, a pair of through holes 25, 26 arranged in the radial direction are formed in the radial part 21 and the outer peripheral part 22 of the bottom frame 2 at positions corresponding to the screw holes 73, 74 of the lug 7. The pair of through holes 25, 26 penetrate through the radial part 21 and the outer peripheral part 22 in the upper-lower direction to be linked with the bottom surface of the concave part 24*c*. Although the pair of through holes 25, 26 are holes for screw-fixing the lug 7 by using fixing bolts B2, a reinforcement frame 9 is also jointly fastened by using the fixing bolts B2. The reinforcement frame 9 is a frame that forms the skeleton of the housing 1 together with the bottom frame 2 and the top frame 3.

The reinforcement frame 9 includes an annular part 90 (see FIG. 3) and a protrusion part 91. The annular part 90 is in an annular shape overlapped with the outer peripheral part 22 of the bottom frame 2. The protrusion part 91 protrudes from the annular part 90 toward the inner peripheral side. The respective annular part 90 and the protrusion part 91 are integrally formed by using a metal plate.

A pair of through holes 92, 93 (see FIG. 4A) are formed in the annular part 90 and the protrusion part 91 of the reinforcement frame 9 at positions corresponding to the through holes 25, 26 of the bottom frame 2. By fastening the fixing bolts B2 inserted into the respective through holes 25, 26, 92, 93 of the bottom frame 2 and the reinforcement frame 9 to the screw holes 73, 74 of the lug 7, the bottom frame 2 and the reinforcement frame 9 are jointly fastened by the lug 7.

In this way, in the embodiment, the reinforcement frame 9 (annular part 90) formed by using a material (metal plate) more rigid than the bottom frame 2 is fixed to the outer peripheral part 22 of the bottom frame 2. The reinforcement frame 9 includes the protrusion part 91 protruding from the inner peripheral side of the reinforcement frame 9 to be fixed (screw-fixed) to the radial part 21. Therefore, the rigidity of the radial part 21 can be effectively increased by the protrusion part 91.

In addition, the fixed part 72 of the lug 7 extends to the inner peripheral side with respect to the outer peripheral surface of the body part 30 (housing 1), and is fixed to the lower surface of the bottom frame 2 (housing 1) by the fixing bolt B2. Therefore, the tension bolt B1 (see FIG. 4A) for applying a tensile force to the head 4 and the fixing bolt B2 for fixing the lug 7 to the bottom frame 2 can be disposed alternately in the radial direction. Accordingly, compared with the structure in which a bolt for fixing a lug to the housing from a position below the lug, as in the conventional technique (see, for example, Japanese Laid-open No. 2014-130373), the dimension of the lug 7 in the upper-lower direction can be reduced. Accordingly, the bottom frame 2 (housing 1) can be thinned.

Moreover, the fixing bolt B2 inserted into the bottom frame 2 (reinforcement frame 9) from the upper side is fastened to the fixed part 72. Therefore, the exposure of the head part of the fixing bolt B2 on the lower surface side of the lug 7 can be suppressed. Accordingly, the appearance of the percussion instrument 100 can be improved.

Here, the lug 7 (fixed part 72) is screw-fixed to the lower surface of the bottom frame 2 by the fixing bolt B2. Therefore, the load at the time of fastening the tension bolt B1 to the fastening part 70 acts on the lower surface of the bottom frame 2 (housing 1) via the fixing bolt B2.

More specifically, if the contact portion between the outer edge of the bottom frame 2 (bottom surface of the concave part 24*c*) and the fixed part 72 of the lug 7 is set as a contact point P (see FIG. 4A), when the tension bolt B1 is fastened to the fastening part 70, a moment that pulls the fastening part 70 upward with the contact point P serving as the center (fulcrum) while pulls the fixed part 72 and the fixing bolt B2 downward is generated. Accordingly, the load via the fixing bolt B2 acts on the lower surface of the bottom frame 2 (housing 1).

Comparatively, in the embodiment, the lug 7 (fixed part 72) is screw-fixed to the lower surface of the bottom frame 2 by using the two fixing bolts B2 arranged in the radial direction. Therefore, the load acting on the bottom frame 2 at the time of fastening the tension bolt B1 can be dispersed to two positions in the radial direction. Accordingly, the bottom frame 2 is thinned, while the durability of the bottom frame 2 (housing 1) with respect to the load at the time of fastening the tension bolt B can be secured.

Also, according to the above, the annular reinforcement frame 9 formed by a material more rigid than that of the bottom frame 2 is superimposed on the bottom frame 2, and the respective frames 2, 9 and the fixed part 72 are jointly fastened by the fixing bolt B2. Accordingly, the vicinity of the fixing bolt B2 where the load at the time of fastening the tension bolt B1 acts most significantly can be effectively reinforced by the reinforcement frame 9. Thus, similarly, the bottom frame 2 is thinned, while the durability of the bottom frame 2 (housing 1) with respect to the load at the time of fastening the tension bolt B can be secured.

In addition, the fastening part 70 is provided on the outer peripheral side of the radial part 21 (position arranged in the radial direction) where the concave parts 24*a* to 24*c* are formed, the load at the time of fastening the tension bolt B1 can be received by a region where the rigidity of the bottom frame 2 is higher. Accordingly, the bottom frame 2 is thinned, while the durability of the bottom frame 2 (housing 1) with respect to the load at the time of fastening the tension bolt B can be secured.

In addition, the lug 7 (lower surface part 71 and fixed part 72) are fit into the concave parts 24*b*, 24*c* formed on the lower surface of the bottom frame 2 (housing 1), so the rigidity of the bottom frame 2 (housing 1) around the fixed part 72 can be effectively increased by the concave parts 24*b*, 24*c*. Moreover, by fitting the lug 7 into the concave parts 24*b*, 24*c*, the stepped difference created on the lower surface side of the bottom frame 2 can be filled by the lug 7. Therefore, the appearance of the percussion instrument 100 can be improved.

According to the above, the bottom frame 2 and the reinforcement frame 9 are jointly fastened to the lug 7 by the fixing bolt B2. However, the bottom frame 2 and the top frame 3 are screw-fixed to the reinforcement frame 9 by using fixing bolts B3, B4.

Specifically, a pair of screw holes 94, 95 arranged in the radial direction are formed between the through holes 92, 93 of the reinforcement frame 9. Also, a through hole 27 is formed in the radial part 21 of the bottom frame 2 at a position corresponding to the screw hole 94, and a through hole 32 (see FIG. 4A) is formed in the support part 31 (an annular part 31*c* to be described afterwards) of the top frame 3 at a position corresponding to the screw hole 95.

The fixing bolt B3 inserted into the through hole 27 from the lower side of the bottom frame 2 (radial part 21) is fastened to the screw hole 94 of the reinforcement frame 9, and the fixing bolt B4 inserted into the through hole 32 from the upper side of the top frame 3 (support part 31) is fastened to the screw hole 95. The fixing bolts B3, B4 are arranged in the radial direction with the pair of fixing bolts B2. Accordingly, in the vicinity of the fixing bolt B2 where the load at the time of fastening the tension bolt B1 acts most significantly, the housing 1 formed by the bottom frame 2, the top frame 3, and the reinforcement frame 9 can be effectively reinforced. Accordingly, the housing 1 is thinned, and the durability of the housing 1 with respect to the load at the time of fastening the tension bolt B1 can be secured.

In this way, in the embodiment, the bottom frame 2 and the top frame 3 can be screw-fixed to the reinforcement frame 9 formed by using a metal plate. Therefore, the function of securing the rigidity of the housing 1 can be mainly assigned to the reinforcement frame 9, and the thicknesses of the bottom frame 2 and top frame 3 can be correspondingly reduced. Thus, the rigidity of the housing 1 is secured, while the housing 1 can be thinned.

Figure 5:
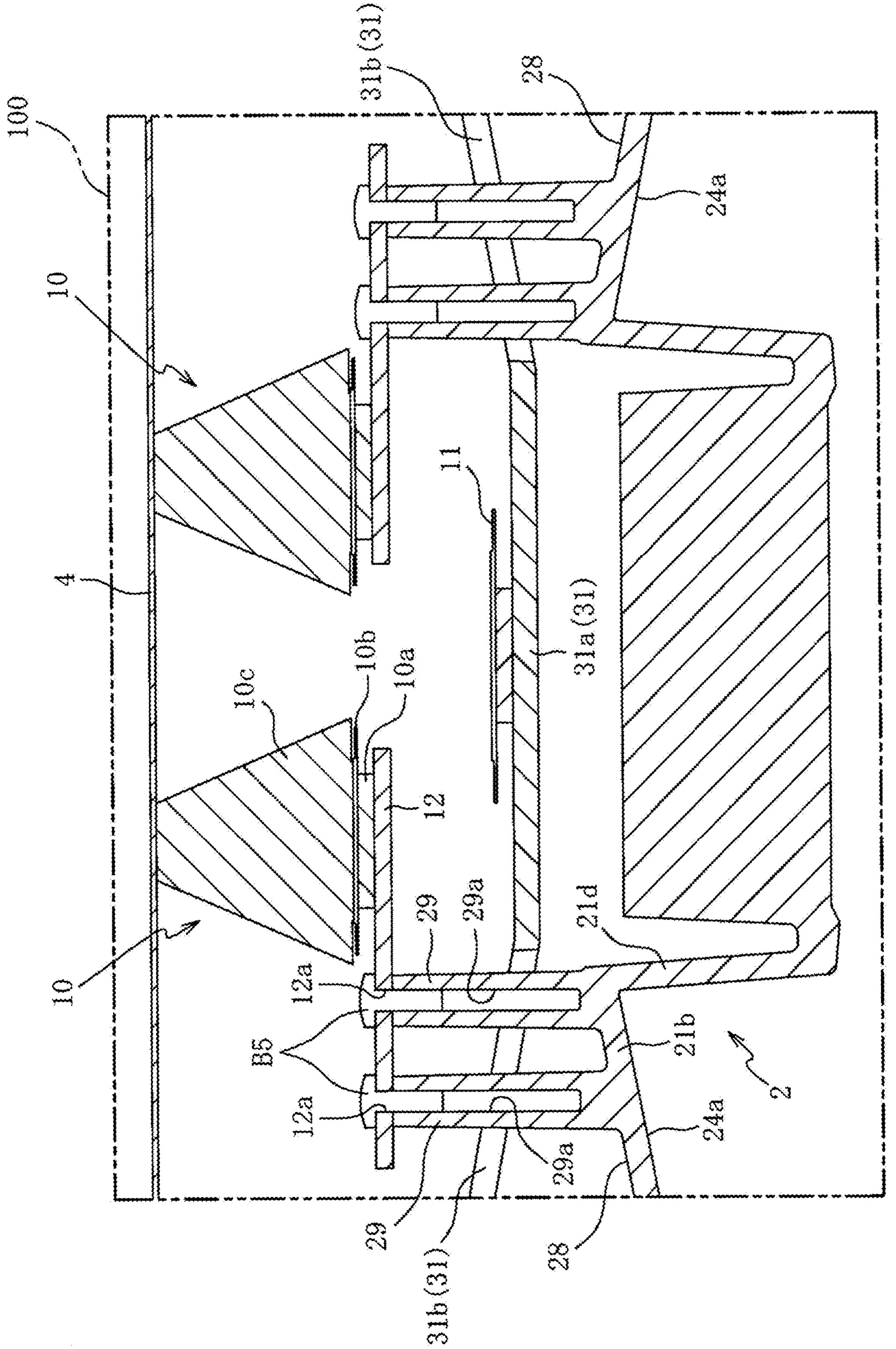
FIG. 5 is a partially enlarged cross-sectional view of the percussion instrument taken along a line V-V of FIG. 3.

Then, with reference to FIGS. 3 to 5, the configuration for detecting the vibration at the time of percussion to the head 4 and the rim 5 by using the head sensor 10 and the rim sensor 11 is described. FIG. 5 is a partially enlarged cross-sectional view of the percussion instrument 100 taken along a line V-V of FIG. 3. In FIG. 5, although the end surface of the cut-off portion of the percussion instrument 100 cut off at a plane including the axis of the body part 30 and the protrusion part 29 is shown, one first connection part 31*b* (see FIG. 3) located behind (back side in a direction perpendicular to the paper surface) the cut-off surface is schematically shown.

Firstly, the percussion to the rim 5 is described. As shown in FIG. 4A, since the rim 5 is supported by the upper side of the body part 30 of the top frame 3 via the head 4, the vibration at the time of the percussion to the rim 5 is mainly transmitted to the support part 31 via the body part 30.

In the following description, among the plate-shaped support part 31, the portion supporting the rim sensor 11 in a region including the axis of the body part 30 is described as a central part 31*a*, a portion extending radially from the central part 31*a* is described as the first connection part 31*b*, and a portion connecting, in an annular shape, the outer edges of multiple (six in the embodiment) first connection parts 31*b* arranged in the peripheral direction is referred to as the annular part 31*c* (see FIG. 3).

The first connection part 31*b* connects the central part 31*a* and the annular part 31*c* of the top frame 3 along the radial direction (linearly). The vibration at the time of the percussion to the rim 5 is transmitted to the rim sensor 11 via the body part 30, the annular part 31*c*, the first connection part 31*b*, and the central part 31*a*. The rim sensor 11 is a disk-shaped piezoelectric element, and is bonded to the central part 31*a* (see FIG. 5) via a double-sided tape with cushion properties.

When the rim sensor 11 detects a vibration, a musical tone signal is generated by a sound source (not shown) based on the detection result. The musical tone signal is output to an amplifier or a speaker (neither of which is shown), so that an electronic musical tone is emitted from a speaker (the same applies to the head sensor 10 to be described afterwards).

The support part 31 (frame formed by the central part 31*a*, the first connection 31*b*, and the annular part 31*c*) supporting the rim sensor 11 is connected (via the annular part 31*c*) to the body part 30 throughout the entire periphery of the peripheral direction. Therefore, wherever the rim 5 is percussed in the peripheral direction, the vibration due to such percussion is easily transmitted to the rim sensor 11 of the central part 31*a* via the first connection part 31*b*.

In addition, while the details of the support structure (see FIG. 5) of the head sensor 10 by using the bottom frame 2 will be described afterwards, the bottom frame 2 supporting the head sensor 10 and the top frame 3 supporting the rim sensor 11 are separate components. Accordingly, the erroneous detection of the vibration by the head sensor 10 at the time of the percussion to the rim 5, or the erroneous detection of the vibration by the rim sensor 11 at the time of the percussion to the head 4, can be suppressed. As a result, the accuracy of detecting the percussion to the rim 5 can be facilitated.

In addition, since multiple first connection parts 31*b* connecting the body part 30 (annular part 31*c*) and the central part 31*a* are arranged in the peripheral direction, through holes are formed between the first connection parts 31*b*. By forming the through holes, the echo of the vibration at the support part 31 at the time of the percussion to the head 4 can be suppressed. In addition, by forming the sound emission holes 23 in the bottom frame 2 while forming through holes between the first connection parts 31*b* of the support part 31, the vibration at the time of the percussion to the head 4 can be easily emitted to the outside through the through holes of the support part 31 and the sound emission holes 23 of the bottom frame 2. Accordingly, the volume of the sound generated at the time of the percussion to the head 4 can be reduced.

In addition, since the body part 30 and the support part 31 including the first connection part 31*b* are formed integrally, the vibration at the time of the percussion to the rim 5 is easily transmitted to the first connection part 31*b* from the body part 30. Accordingly, the vibration at the time of the percussion to the rim 5 can be easily detected by the rim sensor 11 of the central part 31*a*, so the accuracy of detecting the percussion to the rim 5 can be facilitated.

Here, as described above, the bottom frame 2 is screw-fixed to the lower surface of the top frame 3 via the reinforcement frame 9 (by using the fixing bolts B2, B4). However, it is possible to screw-fix the bottom frame 2 or the reinforcement frame 9 to the first connection part 31*b*, for example. However, when the bottom frame 2 or the reinforcement frame 9 is screw-fixed to the first connection part 31*b*, the screw-fixed portion may obstruct the vibration (bending) of the first connection part 31*b*.

Regarding this, in the embodiment, the bottom frame 2 and the reinforcement frame 9 are screw-fixed to the lower surface of the top frame 3 (by the fixing bolt B4) on the outer peripheral side with respect to the first connection part 31*b*. Therefore, the obstruction of such screw-fixed portion to the vibration of the first connection part 31*b* can be suppressed. Since the first connection part 31*b* vibrates easily at the time of the percussion to the rim 5, the vibration at the time of the percussion to the rim 5 is easily detected by the rim sensor 11.

In addition, according to a percussion instrument 200 according to a second embodiment (see FIG. 6) to be described afterwards, it is possible to omit the reinforcement frame 9 to directly screw-fix the top frame 3 to a bottom frame 202. However, in the structure in which the resin-made frames 202 and 3 are screw-fixed, the rigidity of the screw-fixed portion is reduced. In the case where the rigidity of the screw-fixed portion is reduced, due to the impact of the percussion to the rim 5, the bottom frame 2 may vibrate easily, or the vibration attenuates at the screw-fixed portion with a low rigidity. Therefore, the vibration at the time of the percussion to the rim 5 cannot be efficiently transmitted to the rim sensor 11 via the first connection part 31*b*.

Regarding this, in the embodiment, the reinforcement frame 9 more rigid than the bottom frame 2 and the top frame 3 is screw-fixed between the bottom frame 2 and the top frame 3. Therefore, the rigidity of the linking portions of the respective frames 2, 3, and 9 can be increased. Accordingly, the vibration of the bottom frame 2 due to the impact of the percussion to the rim 5 or the attenuation of the vibration at the linking portions of the respective frames 2, 3 9 can be suppressed. Accordingly, the vibration at the time of the percussion to the rim 5 can be efficiently transmitted to the rim sensor 11 via the first connection part 31*b*.

In addition, a second connection part 31*d* (see FIG. 3) branching from the first connection part 31*b* is formed at the support part 31. The second connection part 31*d* extends linearly at an angle inclined with respect to the radial direction. The substantially central portion of the first connection part 31*b* (the portion on the central side with respect to the two ends of the first connection part 31*b* in the radial direction) and the annular part 31*c* are connected by the second connection part 31*d*.

In this way, by connecting the second connection part 31*d* that branches from the first connection part 31*b* on the outer peripheral side with respect to the central part 31*a* with the body part 30 (annular part 31*c*), the vibration transmission path linked with the first connection part 31*b* from the body part 30 can be increased by the second connection part 31*d*. Thus, the vibration at the time of the percussion to the rim 5 is easily transmitted to the rim sensor 11, so the accuracy of detecting the percussion to the rim 5 can be increased.

In the embodiment, for each of the first connection parts 31*b* arranged in the peripheral direction, a symmetric shape in which two second connection parts 31*d* sandwich the first connection part 31*b* is formed. That is, when viewed from a top view, the two second connection parts 31*d* form a line-symmetric shape by using a line along the radial direction (the first connection part 31*b*) as the axis of symmetry. However, such two connection parts 31*d* may also be formed asymmetrically.

Since the second connection parts 31*d* are formed on two sides of each first connection part 31*b* in the peripheral direction (two second connection parts 31*d* branch from each first connection part 31*b*), there is a region in which the first connection part 31*b* and the second connection part 31*d* are adjacent and a region in which the second connection parts 31*d* are adjacent in the peripheral direction of the top frame 3.

The second connection parts 31*d* adjacent in the peripheral direction are connected by a third connection part 31*e* in the peripheral direction. The third connection part 31*e* extends in an arc shape along the peripheral direction and connects substantially central portions of the second connection parts 31*d* (the portion on the central side with respect to two ends of the second connection part 31*d* in the radial direction).

By connecting the second connection parts 31*d* adjacent in the peripheral direction by using the third connection part 31*e*, the vibration transmission path linked with the first connection part 31*b* from the body part 30 is further increased due to the third connection path 31*e*. Thus, the vibration at the time of the percussion to the rim 5 is easily transmitted to the rim sensor 11, so the accuracy of detecting the percussion to the rim 5 can be increased.

Each of the first connection parts 31*b* arranged in the peripheral direction is arranged at a position overlapped with the sound emission hole 23 (see FIG. 3) of the bottom frame 2 in the upper-lower direction. That is, while not shown in the drawings, in the case where the bottom frame 2 is viewed from a bottom perspective, the first connection part 31*b* is disposed in a region including the center of the sound emission hole 23 in the peripheral direction. Meanwhile, the two second connection parts 31*d* branching from the first connection part 31*b* are disposed along the edge of the sound emission hole 23 (the radial part 21) extending in the radial direction. In this way, by forming each of the connection parts 31*b*, 31*d* in a shape corresponding to the sound emission hole 23 (radial part 21), the appearance of the percussion instrument 100 can be improved when viewed from the bottom view.

Here, for the purpose of increasing the vibration transmission path from the body part 30 (annular part 31*c*) toward the central part 31*a*, for example, a configuration in which an end of the second connection part 31*d* is connected with the central part 31*a*, instead of the first connection part 31*b*, or a configuration in which a connection portion linking the third connection part 31*c* and the central part 31*a* is further provided can be adopted. However, in such configuration, while the vibration transmission path increases, the point at which the vibration of the central part 31*a* itself (the upper-lower displacement of the central part 31*a* due to the bending of the first connection part 31*b*) is limited increases. As a result, the sensitivity of the rim sensor 11 with respect to the percussion to the rim 5 may decrease easily.

Comparatively, in the embodiment, only the first connection part 31*b* extending in the radial direction is connected with the central part 31*a*. Accordingly, the point at which the vibration of the central part 31*a* itself is limited can be decreased, whereas a large number of vibration transmission paths can be formed in the vicinity of the body part 30 (annular part 31*c*). Thus, the sensitivity of the rim sensor 11 with respect to the percussion to the rim 5 can be increased.

While the percussion to the head 4 will be described in the following, the support structure of the head sensor 10 is described first. According to the above, while the concave parts 24*a* to 24*c* are formed on the bottom surface 21*a* of the radial part 21 of the bottom frame 2, with the concave parts 24*a* to 24*c* being formed, a convex part is formed on the upper surface side of the radial part 21. In the following description, a configuration of a convex part 28 corresponding to the concave part 24*a* is described.

As shown in FIGS. 4 and 5, in the region in which the concave part 24*a* is formed, the radial part 21 is formed in a plate shape with a substantially constant thickness. Therefore, the convex part 28 corresponding to the concave part 24*a* is formed on the upper surface side of the radial part 21. More specifically, the radial part 21 includes a first plate 21*b* whose lower surface serves as the bottom surface (upper surface being the upper surface of the convex part 28) of the concave part 24*a*, and a pair of second plates 21*c* extend downward from the two ends of the first plate 21*b* in the peripheral direction (the left-right direction of FIG. 4B). The inner edge (the end on the right side in FIG. 4A) of the space surrounded by the first plate 21*b* and the second plate 21*c* is blocked by a third plate 21*d*, and the concave part 24*a* is formed by the first to third plates 21*b* to 21*d*.

In addition, a pair of fourth plates 21*e* (see FIG. 4B) extend from the lower ends of the pair of second plates 21*c* toward the outer sides (orientations away from each other) in the radial direction. Fifth plates 21*f* extend upward from the ends of the pair of fourth plates 21*e* on the outer sides (sides opposite to the second plates 21*c*) in the radial direction. The fourth plate 21*e* is a portion forming the bottom surface 21*a* of the radial part 21, and the fifth plates 21*f* are portions forming the side surfaces of the radial part 21 in the peripheral direction.

In this way, with the concave part 24*a* being formed by the first to third plates 21*b* to 21*d* of the radial part 21, the convex part 28 is formed on the upper surface side of the radial part 21, and a pair of protrusion parts 29 that stand up in a columnar shape are formed integrally on the upper surface of the convex part 28 (see FIGS. 3 and 5).

As shown in FIG. 5, the protrusion part 29 protrudes upward with respect to the first connection part 31*b* by passing between the respective first connection parts 31*b*, and the head sensor 10 is installed to the upper surface of the protrusion part 29 via a plate 12.

In this way, in the embodiment, the head sensor 10 is installed to the protrusion part 29 extending toward the upper side of the top frame 3 by passing between the respective first connection parts 31*b*. Accordingly, the head sensor 10 can be brought into contact with the head 4, whereas it is possible to superimpose the top frame 3 on the bottom frame 2 supporting the head sensor 10 (connecting the support part 31 supporting the rim sensor 11 with the body part 30 on the upper side with respect to the bottom frame 2).

By superimposing the top frame 3 supporting the rim sensor 11 on the bottom frame 2 supporting the head sensor 10, the vibration transmission path from the rim 5 to the rim sensor 11 can be reduced, and the vibration transmission path from the rim 5 to the head sensor 10 can be increased. Thus, the vibration at the time of the percussion to the rim 5 is easily detected by the rim sensor 11, and the vibration at the time of the percussion to the rim 5 can be prevented from being erroneously detected by the head sensor 10. Thus, the accuracy of detecting the percussion to the rim 5 can be increased.

The pair of protrusion parts 29 are arranged along the radial direction. When the pair of protrusion parts 29 are arranged as a set, a total of four sets of protrusion parts 29 are provided at equal intervals in the peripheral direction (see FIG. 3). That is, in the embodiment, the vibration at the time of the percussion to the rim 4 is detected by four head sensors 10.

A screw hole 29*a* is formed in each of the pair of protrusion parts 29, and through holes 12*a* are formed in the plate 12 at positions corresponding to the screw holes 29*a*. By fastening fixing bolts B5 inserted into the through holes 12*a* into the screw holes 29*a* of the protrusion parts 29, the plate 12 is fixed to (supported by) the upper surfaces of the protrusion parts 29.

A disk-shaped sensor 10*b* (piezoelectric element) is bonded to the upper surface of the plate 12 by using a double-sided tape 10*a* with a cushion property, and a cushion 10*c* is bonded to the upper surface of the sensor 10*b*. The head sensor 10 is formed by the double-sided tape 10*a*, the sensor 10, and the cushion 10*c*.

The cushion 10*c* is a buffer material in a truncated cone shape by using a flexible material, such as sponge, rubber, thermosetting elastomer, and the upper end of the cushion 10*c* contacts the lower surface of the head 4.

The plate 12 is a plate in a substantially rectangular (rectangular oval) shape in which the dimension in the radial direction (longitudinal direction of itself) is greater than the dimension in the peripheral direction (width direction). An end side in such longitudinal direction (referred to a base end side) is supported by the protrusion part 29. Meanwhile, the bottom frame 2 is not supported by the other end side (referred to as "tip end side" in the following) of the plate 12 in the longitudinal direction.

That is, since the head sensor 10 is supported by the plate 12 in the cantilevered state, when the head 4 is percussed at the vicinity immediately above the cushion 10*c*, the plate 12 is deformed to be bent. Since the impact at the time of the percussion to the head 4 can be absorbed through bending of the plate 12, in the case where the head sensor 10 (cushion 10*c*) is percussed in the vicinity immediately above the head sensor 10, the output value of the sensor 10*b* can be suppressed from becoming extremely large. Accordingly, the sensitivity can be suppressed from being varied in a percussion surface region close to the immediate above of the head sensor 10 or a percussion surface region away from the head sensor 10. Accordingly, the sensitivity distribution of the head sensor 10 with respect to the percussion to the head 4 can be unified.

Here, for example, in a configuration in which the plate 12 (head sensor 10) is supported in a cantilevered manner in a region where the rigidity is relatively low in the bottom frame 2, the impact due to the percussion to the vicinity immediately above the head sensor 10 can be absorbed easily through the bending of the bottom frame 2. In such configuration, due to an error of the thickness (rigidity) at the time of molding the bottom frame 2, the bottom frame 2 may be bent more than required, the percussion force may be absorbed excessively, and an error in the sensitivity of the head sensor 10 may occur easily (it becomes difficult to obtain the desired output value).

Comparatively, in the embodiment, with the concave part 24*a* being formed on the lower surface of the bottom frame 2 (radial part 21), the rigidity of the portion supporting the head sensor 10 can be increased. That is, on the upper surface side of the bottom frame 2 (radial part 21), the convex part 28 in a shape corresponding to the concave part 24*a* is formed, and the plate 12 is installed to the protrusion part 29 provided at the convex part 28. Therefore, the head sensor 10 is supported in a region having a relatively high rigidity. Accordingly, the bottom frame 2 (convex part 28) can be suppressed from being bent by the impact due to the percussion in the vicinity immediately above the head sensor 10.

In addition, the plate 12 is fixed by the pair of protrusion parts 29 arranged along the longitudinal direction of the plate 12. Therefore, even with the pair of protrusion parts 29, the rigidity of the bottom frame 2 (convex part 28) can be improved. Accordingly, the bottom frame 2 (convex part 28) can be suppressed from being bent by the impact due to the percussion in the vicinity immediately above the head sensor 10.

In addition, in the pair of protrusion parts 29 arranged in the radial direction, the protrusion part 29 located on the central side of the bottom frame 2 is formed at a position overlapped, in the upper-lower direction, with the third plate 21*d* forming the inner peripheral surface of the convex part 28. In addition, while not shown in the drawings, the pair of protrusion parts 29 are formed at positions overlapped, in the upper-lower direction, with the second plate 21*c* (see FIG. 4B) forming the side surface of the convex part 28 that faces the peripheral direction. By forming the protrusion parts 29 immediately above the second plate 21*c* and the third plate 21*d*, the bending of the bottom frame 2 (convex part 28) caused by the impact due to the percussion in the vicinity immediately above the head sensor 10 can be suppressed effectively.

In this way, by suppressing the bending of the bottom frame 2 (convex part 28) at the time when the vicinity immediately above the head sensor 10 is percussed, the impact caused by such percussion can be easily absorbed simply by bending of the plate 12. Accordingly, it is difficult to generate an error in the sensitivity of the head sensor 10 (it is difficult to obtain a desired output value), so the percussion to the head 4 can be accurately detected.

In addition, since the pair of protrusion parts 29 arranged along the longitudinal direction of the plate 12 fix the plate 12, the plate 12 can be firmly fixed by the bottom frame 2. Accordingly, the percussion to the head 4 can be accurately detected.

Here, in the embodiment, although multiple (four in the embodiment) head sensors 10 are provided in the percussion instrument 100, for example, it is possible to support the four head sensor 10 by using one plate 12. As an example of such configuration, a configuration as follows may be exemplified: the center of the plate 12 formed in a cruciform shape is fixed to the protrusion parts 29, and the head sensors 10 are installed to the four tip end portions of the cruciform plate 12. In this configuration as well, since the head sensors 10 are supported by the tip end portions of the plate 12 in the cantilevered state, the percussion in the vicinity immediately above each head sensor 10 can be absorbed due to the bending of the plate 12.

However, in the configuration in which multiple head sensors 10 are installed to one plate 12, if the vicinity immediately above any of the head sensors 10 is percussed, the vibration due to the percussion is transmitted to other head sensors (sensors 10*b*) via the plate 12. When such vibration interference occurs, the percussion to the head 4 cannot be accurately detected.

Comparatively, in the embodiment, one head sensor 10 is installed to the tip end side of one plate 12. In the case where the vicinity immediately above one of the head sensors 10 is percussed, the vibration due to such percussion can be suppressed from transmitting to other head sensors 10 (sensor 10*b*). Therefore, the percussion to the head 4 can be accurately detected.

In addition, the base end side of the plate 12 in the longitudinal direction is fixed to the bottom frame 2, and the head sensor 10 is supported by the upper surface of the tip end side of the plate 12. Therefore, the plate 12 is bent easily at the time when the head 4 is percussed in the vicinity immediately above the cushion 10*c*. Accordingly, as the impact at the time of the percussion to the head 4 is absorbed easily, the vibration due to the percussion can be effectively suppressed from being transmitted to other head sensors 10 via the bottom frame 2.

In this way, while the vibration at the time of the percussion to the head 4 is detected by the head sensor 10, the strength (velocity) of the percussion or the percussion position is calculated based on the value summing up the output values of the respective head sensors 10. As a method for calculating the total value, for example, configurations as follows are exemplified: a configuration which sets the total value as a value that is the sum of the peak values of the output waveforms of the respective head sensors 10 (or an average obtained by dividing the value from the respective values), a configuration which sets the total value as a peak value of a combined waveform formed by combining the output waveforms of the respective head sensors 10.

In the case where the strength of the percussion to the head 4 or the percussion value is calculated based on the total value of the output values of the respective head sensors 10, the respective head sensors 10 may be disposed as close as possible. This is because, the closer the distances of the head sensors 10, the less likely it is to generate a difference among the output values (phases or peak values of output waveforms) of the respective head sensors 10 when the head 4 is percussed.

Accordingly, in the embodiment, by facing toward the central side of the bottom frame 2 so that the respective tip ends of the four plates 12 abut against each other, the four head sensors 10 are disposed to be as close as possible while being supported in a cantilevered manner. In addition, the respective head sensors 10 are connected in series on a substrate not shown herein, the output waveforms of the respective head sensors 10 are combined, and, based on the peak value of the combined waveform (the total of the output values of the respective head sensors 10), the strength of the percussion to the head 4 or the percussion position is calculated.

By using the total value of the output values of the respective head sensors 10, even if the output value of one of the head sensors 10 is extremely large, such a large output value is leveled by the output values of other head sensors 10. Therefore, the strength of the percussion to the head 4 or the percussion position can be accurately calculated.

Figure 6:
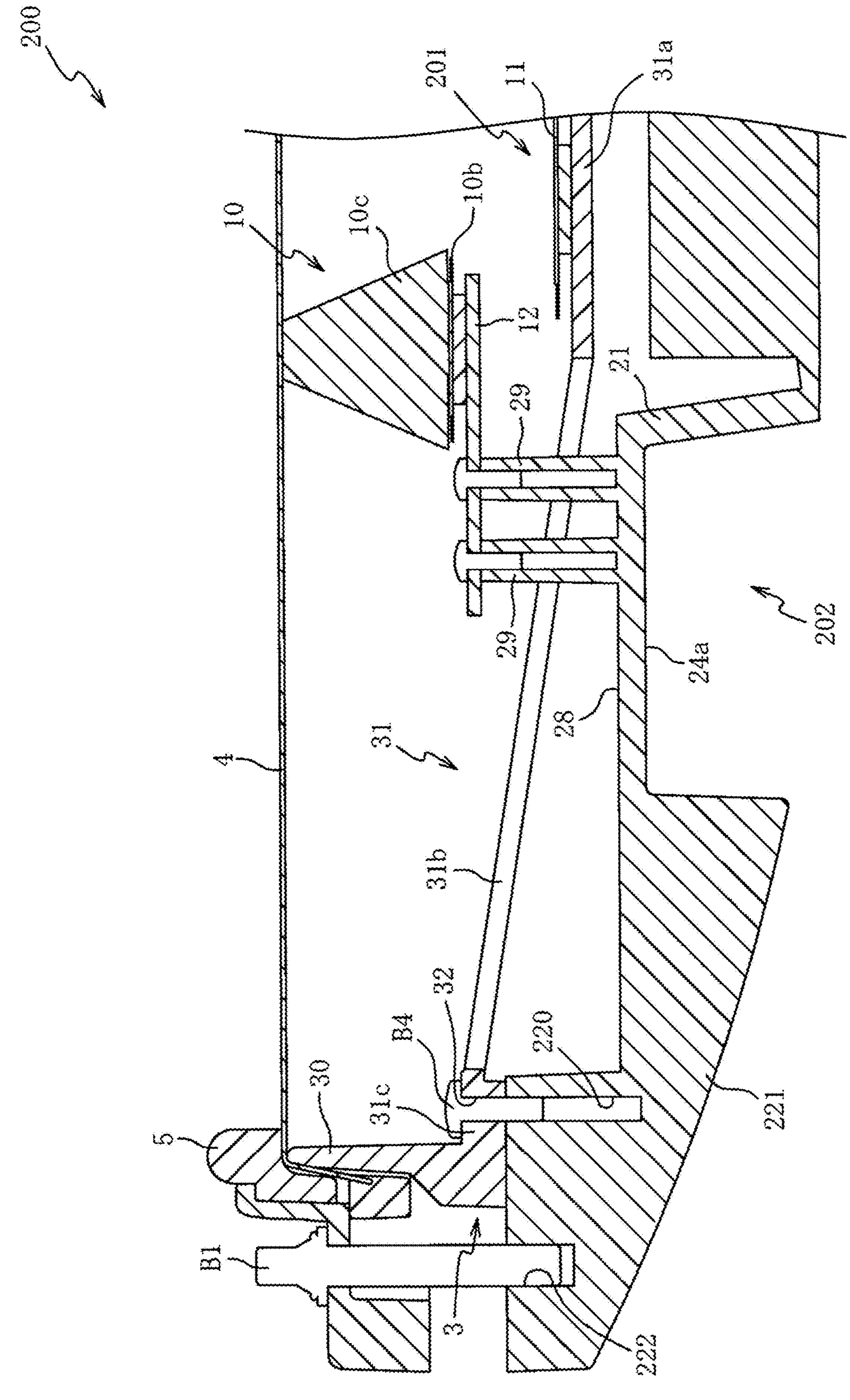
FIG. 6 is a partially enlarged cross-sectional view of a percussion instrument of a second embodiment.

In the following, a percussion instrument 200 according to a second embodiment is described with reference to FIG. 6, and the portions same as those of the first embodiment are labeled with the same reference symbols, and the description is omitted. FIG. 6 is a partially enlarged cross-sectional view of the percussion instrument 200 of the second embodiment. In FIG. 6, although the end surface of the cut-off portion of the percussion instrument 200 is shown, one first connection part 31*b* located behind (back side in a direction perpendicular to the paper surface) the cut-off surface is schematically shown.

As shown in FIG. 6, a housing 201 of the percussion instrument 200 of the second embodiment omits the reinforcement frame 9 of the first embodiment, and the top frame 3 is directly superimposed on the bottom frame 202.

In the bottom frame 202, a screw hole 220 is formed at a position corresponding to the through hole 32 of the top frame 3, the fixing bolt B4 inserted into the through hole 32 is fastened to the screw hole 220, thereby fixing the top frame 3 to the bottom frame 202.

A fastening part 221 equivalent to the lug 7 (see FIG. 2) including the fastening part 70, the lower surface part 71, and the fixed part 72, etc., is integrally formed on the lower surface of the bottom frame 202. Among the concave parts 24*a* to 24*c* (see FIG. 2) described in Embodiment 1, the concave parts 24*b*, 24*c* are filled by the fastening part 221, and the concave part 24*a* is formed on the inner peripheral side (right side of FIG. 6) of the fastening part 221.

While not shown in the drawings, the radial parts 21 (see FIG. 2) arranged in the peripheral direction, like the first embodiment, are also formed in the percussion instrument 200 of the embodiment, and the concave part 24*a* is formed on the lower surface of the radial part 21. Accordingly, the formation of a rib in the radial part 21 is not required, or the number of ribs that are formed can be reduced, while the rigidity of the bottom frame 202 (the radial parts 21) can be secured by the concave parts 24*a*. Thus, even in the case where the bottom frame 202 is formed by using resin molding, the sink marks generated in the radial parts 21 can be suppressed. Therefore, the bottom frame 202 can be reinforced by the concave parts 24*a*, while the appearance of the percussion instrument 200 can be improved. In addition, the concave part 24*a* is formed like one groove continuous in the radial direction. Therefore, the rigidity of the bottom frame 202 is secured, while the appearance of the percussion instrument 200 can be improved.

A screw hole 222 for fastening the tension bolt B1 is formed in the fastening part 221, and the screw hole 222 is formed on the outer peripheral side of the concave part 24*a* (a position arranged with the concave part 24*a* in the radial direction). By providing the fastening part 221 (screw hole 222) to which the tension bolt B1 is fastened on the outer peripheral side of the radial part 21 in which the concave part 24*a* is formed, the load at the time of fastening the tension bolt B1 can be received by a region with a high rigidity. Accordingly, the durability of the bottom frame 202 with respect to the load at the time of fastening the tension bolt B1 is secured, while the bottom frame 202 (housing 201) can be thinned.

In addition, in FIG. 6, one first connection part 31*b* is shown schematically, but multiple first connection parts 31*b* are arranged in the peripheral direction, like the first embodiment. Therefore, wherever the rim 5 is percussed in the peripheral direction, the vibration due to such percussion is easily transmitted to the rim sensor 11 of the central part 31*a* via the first connection part 31*b*. In addition, a bottom frame 202 supporting a head sensor 10 and a top frame 3 supporting the rim sensor 11 are separate components. Accordingly, the erroneous detection of the percussion to the rim 5 by the head sensor 10 and the erroneous detection of the percussion to the head 4 by the rim sensor 11 can be suppressed. As a result, the accuracy of detecting the percussion to the rim 5 can be facilitated.

In addition, in the embodiment as well, the head sensor 10 (sensor 10*b* and cushion 10*c*) is installed to the tip end side of the plate 12 supported, in the cantilevered state, by the bottom frame 202. Therefore, the impact at the time of the percussion to the head 4 can be absorbed by the bending of the plate 12. Accordingly, the output value of the sensor 10*b* at the time when the vicinity immediately above the head sensor 10 (cushion 10*c*) is percussed can be suppressed from becoming extremely large. Accordingly, the sensitivity distribution of the head sensor 10 with respect to the percussion to the head 4 can be unified.

In addition, as described above, the concave part 24*a* is provided on the lower surface of the bottom frame 202 (radial part 21). Therefore, the convex part 28 corresponding to the concave part 24*a* is formed on the upper surface side of the bottom frame 202 (radial part 21). The convex part 28 having a high rigidity is installed to the plate 12 via the protrusion part 29. Therefore, the bending of the bottom frame 202 (convex part 28) caused by the impact due to the percussion in the vicinity immediately above the head sensor 10 can be suppressed. By suppressing the bending of the bottom frame 202 (convex part 28), the impact caused by the percussion in the vicinity immediately above the head sensor 10 can be easily absorbed by the bending of the plate 12 alone. Therefore, the accuracy of the percussion to the head 4 can be accurately detected.

Figure 7:
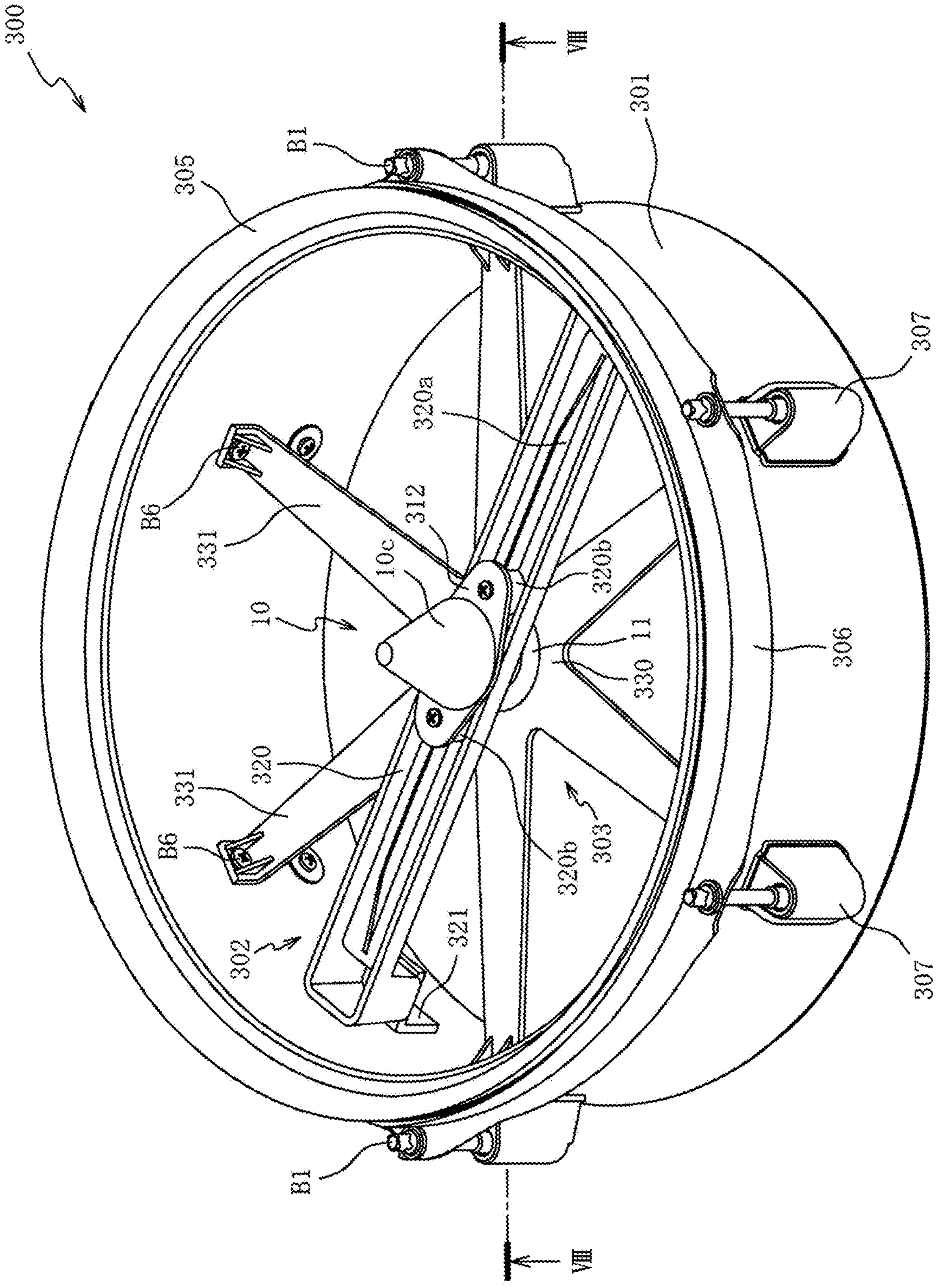
FIG. 7 is a perspective view illustrating a percussion instrument of a third embodiment.
Figure 8:
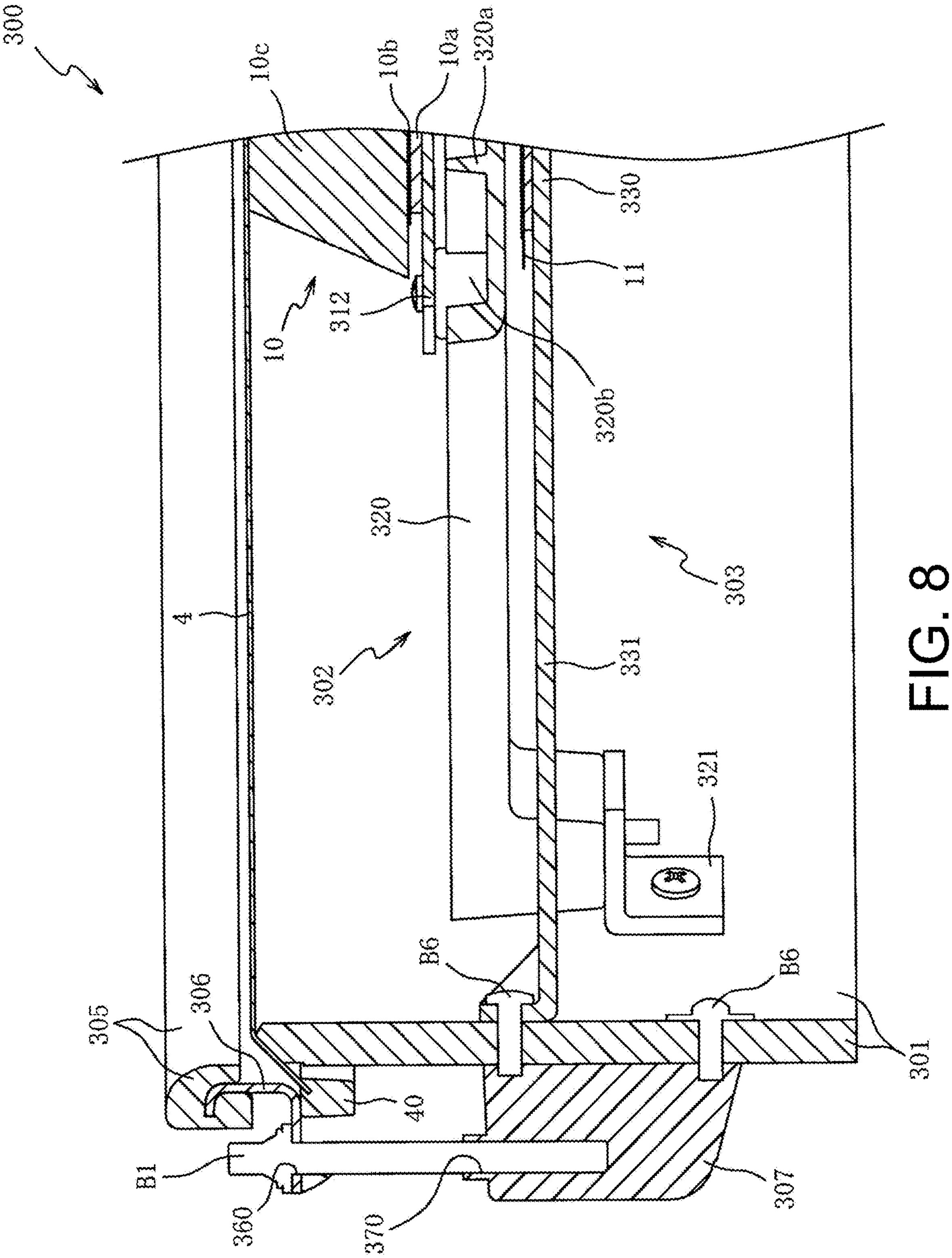
FIG. 8 is a partially enlarged cross-sectional view illustrating the percussion instrument taken along a line VIII-VII of FIG. 7.

In the following, a percussion instrument 300 according to a third embodiment is described with reference to FIGS. 7 and 8, and the portions same as those of the respective embodiments above are labeled with the same reference symbols, and the description is omitted. FIG. 7 is a perspective view illustrating a percussion instrument 300 of a third embodiment, and FIG. 8 is a partially enlarged cross-sectional view illustrating the percussion instrument 300 taken along a line VIII-VII of FIG. 7. In FIG. 7, a state in which the head 4 (see FIG. 8) is removed is shown.

As shown in FIGS. 7 and 8, the percussion instrument 300 of the third embodiment includes a cylindrical shell 301 (body part) forming the housing portion, and the opening portion of the axial end of the shell 301 is covered by the head 4 (see FIG. 8).

The head 4 is installed to the shell 301 by using an annular hoop 306. Through holes 360 (see FIG. 8) are formed at multiple positions in the peripheral direction in the hoop 306, and the tension bolts B1 are inserted into the through holes 360. Multiple lugs 307 are fixed by the fixing bolts B6 on the outer peripheral surface of the shell 301, and, in the state in which the head frame 40 is hooked to the hoop 306, a tension is applied to the head 4 by fastening the tension bolts B1 to screw holes 370 of the lugs 307.

The first frame 302 supporting the head sensor 10 and the second frame 303 supporting the rim sensor 11 are fixed to the inner peripheral side of the shell 301. The first frame 302 is formed by an installation frame 320 to which the head sensor 10 is installed and a securing bracket 321 for fixing the installation frame 320 to the inner peripheral surface of the shell 301.

The securing bracket 321 is an L-shaped bracket screw-fixed to the inner peripheral surface of the shell 301, and the installation frame 320 is a frame made of resin and extending in the radial direction of the shell 301. The installation frame 320 is formed in a channel steel shape having a web and a flange. The two ends of the installation frame 320 in the longitudinal direction are fixed (screw-fixed) to the securing bracket 321 by being bent downward.

A rib 320*a* is integrally formed at the center of the installation frame 320 in the width direction. The rib 320*a* is formed in a plate shape extending in the longitudinal direction (radial direction) of the installation frame 320. Therefore, the rigidity of the installation frame 320 can be increased by the rib 320*a*.

A pair of columnar protrusion parts 320*b* arranged in the longitudinal direction thereof are integrally formed on the installation frame 320, and a plate 312 is fixed to the pair of protrusion parts 320*b*. The plate 312 is formed in a substantially oval shape. The two ends thereof in the longitudinal direction are screw-fixed to the pair of protrusion parts 320*b*. The head sensor 10 supported by the plate 312, like the first embodiment, includes the double-sided tape 10*a*, the sensor 10*b*, and the cushion 10*c*.

The second frame 303 includes a central part 330 supporting the rim sensor 11 and a connection part 331 extending in the radial direction from the central part 330 and connected with the inner peripheral surface of the shell 301. The central part 330 and the connection part 331 are integrally formed by using a resin material. The outer edge portion of the connection part 331 is screw-fixed on the inner peripheral surface of the shell 301 by using the bolt B6.

A rim cover 305 made of rubber and formed in an annular shape is installed to the upper part of the hoop 306. The vibration at the time of the percussion to the rim cover 305 is mainly transmitted to the connection part 331 of the second frame 303 via the head 4 (head frame 40) and the shell 301.

The second frame 303 supporting the rim sensor 11 is connected with the shell 301 at multiple positions (via multiple connection parts 331) in the peripheral direction. Therefore, wherever the rim cover 305 is percussed in the peripheral direction, the vibration due to the percussion is easily transmitted to the rim sensor 11 of the central part 330 via the connection part 331. In addition, since the first frame 302 supporting the head sensor 10 and the second frame 303 supporting the rim sensor 11 are separate components, the vibration at the time of the percussion to the rim cover 305 (head 4) can be suppressed from being erroneously detected by the head sensor 10 (rim sensor 11). Accordingly, the accuracy of detecting the percussion to the rim cover 5 can be increased.

In addition, by arranging multiple connection parts 331 (six in the embodiment) connecting the central part 330 of the second frame 303 and the shell 301 in the peripheral direction, through holes are formed between the connection parts 331. By forming such through holes, the vibration at the time of the percussion to the head 4 is easily emitted to the outside via the through holes. Accordingly, the volume of the sound generated at the time of the percussion to the head 4 can be reduced.

Here, in the embodiment, the second frame 303 (connection part 331) is connected with the shell 301 on a side above the connection position (the fixing position of the securing bracket 321 with respect to the shell 301) with the shell 301 and the first frame 302. Accordingly, the vibration transmission path from the rim cover 305 to the rim sensor 11 is reduced, while the vibration transmission path from the rim cover 305 to the head sensor 10 is increased.

In addition, the first frame 302 includes an installation frame 320 which extends toward the upper side of the second frame 303 by passing between the connection parts 331 from the lower side of the second frame 303, and to which the head sensor 10 is installed. Accordingly, the connection position of the shell 301 and the second frame 303 can be located above the connection position of the shell 301 and the first frame 302, while the head sensor 10 can be brought into contact with the head 4.

In addition, as described above, the vibration at the time of the percussion to the rim cover 305 is mainly transmitted to the second frame 303 via the head 4 (head frame 40) and the shell 301. However, at the time of such percussion, the vibration transmitted to the shell 301 via the tension bolt B1 and the lug 307 is also present. Therefore, in the embodiment, the connection part 331 of the second frame 303 and the shell 301 are jointly fastened to the lug 307 by the fixing bolt B6. Accordingly, at the time of the percussion to the rim cover 305, the vibration transmitted to the shell 301 via the tension bolt B1 and the lug 307 is easily transmitted to the rim sensor 11 via the connection part 33, and the accuracy of detecting the percussion to the rim cover 305 can be increased.

Although the above embodiments have been explained above, the disclosure is not limited to the above embodiments. It can be easily inferred that various improvements and modifications can be made without departing from the spirit of the disclosure.

In the embodiments, the case where the percussion instruments 100, 200, 300 are electronic percussion instrument are described. However, the disclosure is not limited thereto. For example, the configuration in which the fixed part 72 extending to the inner peripheral side with respect to the fastening part 70 of the lug 7 is fixed to the lower surface of the bottom frame 2 (housing 1) or the configuration in which the concave parts 24*a* to 24*c* are formed on the lower surface of the radial part 21 extending radially from the central part 20 of the bottom frame 2 (bottom part of the housing 1) is also applicable to an acoustic percussion instrument (drum).

In the embodiments, the case where the connection position of the body part and the frame (bottom frame 2, 202 or second frame 303) supporting the head sensor 10 is located above the connection position of the body part (body part 30 or shell 301) and the frame (support part 31 or first frame 302) supporting the rim sensor 11. However, the disclosure is not limited thereto. For example, a configuration with a reverse connection position relationship may also be adopted.

As an example of such configuration, in the first and second embodiments, the configuration in which the head sensor 10 installed to the support part 31 (central part 31*a*) is brought into contact with the head 4, while the rim sensor 11 is installed to the bottom frame 2, 202 may be exemplified. In addition, as another example, in the third embodiment, the securing bracket 321 is fixed on the inner peripheral surface of the shell 301 on the upper side with respect to the connection position of the shell 301 and the connection part 331.

In the first and second embodiments, the case where the concave part 24*a* is formed in a groove shape continuous in the radial direction is described. However, the disclosure is not limited thereto. For example, a configuration in which a rib (a plate-shaped wall extending in the peripheral direction) dividing the concave part 24*a*, that is, a configuration in which multiple concave parts arranged intermittently in the radial direction are formed on the lower surface of the bottom frame 2, 202 (radial part 21) may also be adopted.

In the first and second embodiments, the case where the fastening parts 70, 201 to which the tension bolts B1 are fastened is provided on the outer peripheral side of the concave parts 24*a* to 24*c* (radial parts 21) is described. However, the disclosure is not limited thereto. For example, the fastening parts 70, 201 may also be provided on the outer peripheral side of the sound emission hole 23 (a position arranged with the sound emission hole 23 in the radial direction).

In the first and second embodiments, the case where the protrusion part 29 is provided at the convex part 28 formed on the upper surface side of the bottom frame 2, 202 and the head sensor 10 is installed to the protrusion part 29 is described. However, the disclosure is not limited thereto. For example, among the bottom frame 2, 202, the protrusion part 29 may also be formed at a portion where the convex part 28 is not formed (e.g., the central part 20).

In the first and second embodiments, the case where the portion where the width dimension of the radial part 21 gradually decreases or increases toward the outer peripheral side and the width dimension of the concave part 24*a*, 24*b* is formed to gradually decrease or increase toward the outer peripheral side in correspondence with the width dimension of the radial part 21 is described. However, the disclosure is not limited thereto. For example, the width dimension of one (or both) of the radial part 21 and the concave parts 24*a*, 24*b* may be constant from the inner peripheral side to the outer peripheral side. That is, the width dimension (shape) of the radial part 21 or the concave part 24*a*, 24*b* can be set as appropriate.

In the first and second embodiments, the case where the support part 31 to which the rim sensor 11 is installed is connected with the body part 30 (via the annular part 31*c*) throughout the entire periphery is described. However, the disclosure is not limited thereto. For example, a configuration in which the annular part 31*c* is omitted and the first connection part 31*b* is directly connected with the body part 30 may also be adopted. In such configuration as well, wherever the rim 5 is percussed in the peripheral direction, the vibration due to such percussion is easily transmitted to the rim sensor 11 of the central part 31*b* via the first connection part 31*b*.

In the first and second embodiments, the case where multiple through holes are formed among the respective connection parts 31*b*, 31*d*, 31*e* is described. However, the disclosure is not limited thereto. For example, the through holes among the respective connection parts 31*b*, 31*d*, 31*c* may also be omitted, and the support part 31 may be arranged as one plate-shaped frame. In such case, a configuration in which the head sensor 10 is supported and brought into contact with the head 4 by the support part 31, and the rim sensor 11 is supported by the bottom frame 2 may also be adopted. In such configuration as well, the bottom frame 2 supporting the rim sensor 11 is connected with the body part 30 throughout the entire periphery in the peripheral direction (via the reinforcement frame 9). Therefore, wherever the rim 5 is percussed in the peripheral direction, the vibration due to such percussion is easily transmitted to the rim sensor 11.

In the first and second embodiments, the case where the support part 31 supporting the rim sensor 11 is integrally formed with the body part 30 is described. However, the body part 30 and the support part 31 may also be separate components.

In the first and second embodiments, the case where the body part 30 (annular part 31*c*) and the first connection part 31*b* are connected by the second connection part 31*d*, and the second connection parts 31*d* adjacent in the peripheral direction are connected by the third connection part 31*e* is described. However, the disclosure is not limited thereto. For example, some or all of the second connection parts 31*d* or third connection parts 31*e* may be omitted, and the annular part 31*c* may also be omitted to directly connect the first connection part 31*b* with the body part 30.

In addition, in the case where the second connection part 31*d* is omitted, a connection part (fourth connection part) connecting the first connection parts 31*b* adjacent in the peripheral direction may also be provided. According to such configuration, the point at which the bending of the first connection part 31*b* is limited is decreased, and the respective first connection parts 31*b* arranged in the peripheral direction are easily bent integrally. Therefore, the vibration at the time of the percussion to the rim 5 is easily transmitted to the rim sensor 11.

In addition, a portion connecting the first connection part 31*b* and the second connection part 31*d* or a portion connecting the central part 31*a* and the second connection part 31*d* may also be provided. In addition, a portion connecting the central part 31*a* and the third connection part 31*e* or a portion connecting the third connection part 31*e* and the annular part 31*c* may also be provided.

In addition, in the first and second embodiments, the case where the respective parts 31*a* to 31*c* of the support part 31 are integrally formed is described. However, it may also be that some or all of the respective parts 31*a* to 31*e* are formed as separate parts with other parts.

In addition, in the first and second embodiments, the case where each first connection part 31*b* is located above the sound emission hole 23 and the second connection part 31*d* is disposed along the edge of the sound emission hole 23 (radial part 21) is described. However, for example, the first connection part 31*b* or the second connection part 31*d* may also be disposed above the radial part 21. That is, the configuration of the support part 31 supporting the rim sensor 11 is not limited to the above configuration, and can be modified as appropriate.

In the first and second embodiments, the case where the plate 12 is fixed to the pair of protrusion parts 29 is described. However, the disclosure is not limited thereto. For example, it may also be that a plate is fixed to one or three or more protrusion parts 29.

In the first and second embodiments, the case where multiple head sensors 10 are provided, and one head sensor 10 is installed to the tip end side of one plate 12 is described. However, the disclosure is not limited thereto. For example, it suffices as long as the number of the head sensor 10 is one or more. In addition, it may also be that the plate 12 is formed in a circular shape or a polygonal shape in accordance with the number of the head sensors 10, and multiple head sensors 10 are supported by one plate 12.

As an example of such configuration, a configuration in which the central portion of the plate formed in a circular or polygonal shape (e.g., cruciform shape) is fixed to the protrusion part 29, and the head sensor 10 is installed to a portion (the tip end portion that projects from the fixed portion in a cantilevered state) on the outer edge side of the plate with respect to such fixed portion may be exemplified. According to such configuration, the number of parts is reduced, and multiple head sensors 10 can be supported by the plate 12 in the cantilevered state.

In the first and second embodiments, the case where the tip end of each of the plates 12 faces the central side of the bottom frame 2 is described. However, the disclosure is not limited thereto. For example, the tip end of each of the plates 12 faces the outer peripheral side of the bottom frame 2.

In the first embodiment, the case where the fixing bolt B2 inserted into the bottom frame 2 (reinforcement frame 9) from the upper side is fastened to the fixed part 72 is described. However, the disclosure is not limited thereto. For example, the fixing bolt B2 inserted from the lower side of the lug 7 may also be fastened to the bottom frame 2 (reinforcement frame 9).

In the first embodiment, the case where the annular reinforcement frame 9 formed by a material more rigid than the bottom frame 2 is superimposed on the bottom frame 2, and each of the respective frames 2, 9, and the lug 7 (fixed part 72) are jointly fastened by using the fixing bolt B2 is described. However, the disclosure is not limited thereto. For example, it is naturally possible to fix the reinforcement frame 9 or the lug 7 with respect to the bottom frame 2 by using separate bolts. In addition, it is also possible to jointly fasten the top frame 3, the reinforcement frame 9, and the bottom frame 2 to the lug 7 by using the fixing bolt B4.

In addition, in the first embodiment, the case where the fixing bolts B2 to B4 are arranged along the radial direction is described. However, the fixing positions of these fixing bolts B2 to B4 may be staggered in the peripheral direction. In addition, it is possible to omit one of the two fixing bolts B2 arranged in the radial direction or it is possible to omit the fixing bolt B3.

In the case where one of the two fixing bolts B2 arranged in the radial direction is omitted, the fixing bolt B2 located on the inner peripheral side (right side of FIG. 4A) may be retained (omitting the fixing bolt B2 on the outer peripheral side). This is because, for the fixing bolt B2 on the inner peripheral side that is in a relatively long distance from the contact point P, the load that acts at the time of fastening the tension bolt B1 is relatively small.

In addition, in the first embodiment, the case where the bottom frame 2 and the reinforcement frame 9 are screw-fixed to the lower surface of the top frame 3 (annular part 31*c*) on the outer peripheral side with respect to the first connection part 31*b* is described. However, for example, the bottom frame 2 and the reinforcement frame 9 may also be screw-fixed to the first connection part 31*b* or the second connection part 31*d*. That is, the fixing structures of the respective frames 2, 3, 9 and respective lugs 9 are not limited to the above, and may be modified as appropriate.

In the first and second embodiments, the case where the protrusion part 91 protrudes toward the inner peripheral side from the annular part 90 of the reinforcement frame 9. However, the disclosure is not limited thereto. For example, it may also be that the protrusion part 91 is omitted, and only the annular part 90 is screw-fixed to the outer peripheral part 22 of the bottom frame 2.

In the third embodiment, the case where the second frame 303 supporting the rim sensor 11 is connected with the shell 301 (via multiple connection parts 331) at multiple positions in the peripheral direction is described. However, the disclosure is not limited thereto. For example, it may also be that the through holes among the respective connection parts 331 are omitted, and the second frame 303 is arranged as one plate-like frame. In such case, a configuration in which the shell 301 and the first frame 301 are connected on the upper side with respect to the connection position between the shell 301 and the second frame 303. According to such configuration, the second frame 303 can be connected with the shell 301 throughout the entire periphery in the peripheral direction. Therefore, wherever the rim cover 305 is percussed in the peripheral direction, the vibration due to such percussion is easily transmitted to the rim sensor 11 via the second frame 303.

What is claimed is:

1. A percussion instrument, comprising:
- a head, forming a percussion surface;
- a housing, having a body part in a cylindrical shape having an opening on an upper end side covered by the head; and
- a bottom frame, forming a bottom surface of the housing, wherein the bottom frame comprises:
  - a central part, forming a central portion of the bottom frame;
  - a plurality of radial parts, radially extending from the central part toward an outer edge side of the housing; and
  - an outer peripheral part, connecting outer edges of the plurality of radial parts in a peripheral direction,
- wherein
- a concave part extending from a side of the central part toward a side of the outer peripheral part is formed on a lower surface of each of the plurality of radial parts, and
- a pair of protrusions of each of the plurality of radial parts respectively extend downward from two opposite sides of the concave part in the peripheral direction and extend from the side of the central part toward the side of the outer peripheral part, and a plate of each of the pair of protrusions forms a bottom surface of each of the plurality of radial parts.

2. The percussion instrument as claimed in claim 1, wherein the concave part is formed in a groove shape continuous in a radial direction of the body part.

3. The percussion instrument as claimed in claim 1, comprising: a reinforcement frame, formed by using a material more rigid than the bottom frame, fixed to the outer peripheral part, and having an annular shape,
- wherein the reinforcement frame comprises a protrusion part protruding toward an inner peripheral side of the reinforcement frame and fixed to each of the plurality of radial parts.

4. The percussion instrument as claimed in claim 1, comprising a fastening part, provided on an outer peripheral side of the body part; and a tension bolt for applying a tensile force to the head by being fastened to the fastening part,
- wherein the fastening part is provided on an outer peripheral side of the concave part.

5. The percussion instrument as claimed in claim 1, comprising: a head sensor, contacting the head and detecting a vibration when the head is percussed,
- wherein a convex part having a shape corresponding to the concave part is formed on an upper surface side of each of the plurality of radial parts, and
- the head sensor is supported by the convex part.

6. The percussion instrument as claimed in claim 1, wherein a portion of each of the plurality of radial parts whose dimension in the peripheral direction gradually decreases or increases toward an outer peripheral side of the bottom frame is formed at each of the plurality of radial parts, and
- a dimension of the concave part in the peripheral direction is formed to gradually decrease or increase toward the outer peripheral side of the bottom frame in correspondence with a dimension of each of the plurality of radial parts in the peripheral direction.

7. A bottom frame reinforcement method, which is a bottom frame reinforcement method in a percussion instrument, the percussion instrument comprising: a head, forming a percussion surface; a housing, having a body part in a cylindrical shape having an opening on an upper end side covered by the head; and a bottom frame, forming a bottom surface of the housing, wherein the bottom frame comprises: a central part, forming a central portion of the bottom frame; a plurality of radial parts, radially extending from the central part toward an outer edge side of the housing; and an outer peripheral part, connecting outer edges of the radial parts in a peripheral direction, the bottom frame reinforcement method comprising:

forming a concave part extending from a side of the central part toward a side of the outer peripheral part protrusion on a lower surface of each of the plurality of radial parts, and forming a pair of protrusions of each of the plurality of radial parts respectively extend downward from two opposite sides of the concave part in the peripheral direction and extending from the side of the central part toward the side of the outer peripheral part, and a plate of each of the pair of protrusions forms a bottom surface of each of the plurality of radial parts.

8. The bottom frame reinforcement method as claimed in claim 7, wherein the concave part is formed in a groove shape continuous in a radial direction of the body part.

9. The bottom frame reinforcement method as claimed in claim 7, wherein the percussion instrument comprises: a reinforcement frame, formed by using a material more rigid than the bottom frame, fixed to the outer peripheral part, and having an annular shape, wherein the reinforcement frame comprises a protrusion part protruding toward an inner peripheral side of the reinforcement frame and fixed to each of the plurality of radial parts.

10. The bottom frame reinforcement method as claimed in claim 7, wherein the percussion instrument comprises: a fastening part, provided on an outer peripheral side of the body part; and a tension bolt for applying a tensile force to the head by being fastened to the fastening part, wherein the fastening part is provided on an outer peripheral side of the concave part.

11. The bottom frame reinforcement method as claimed in claim 7, wherein the percussion instrument comprises: a head sensor, contacting the head and detecting a vibration when the head is percussed, wherein a convex part having a shape corresponding to the concave part is formed on an upper surface side of each of the plurality of radial parts, and the head sensor is supported by the convex part.

12. The bottom frame reinforcement method as claimed in claim 7, wherein a portion of each of the plurality of radial parts whose dimension in the peripheral direction gradually decreases or increases toward an outer peripheral side of the bottom frame is formed at each of the plurality of radial parts, and a dimension of the concave part in the peripheral direction is formed to gradually decrease or increase toward the outer peripheral side of the bottom frame in correspondence with a dimension of each of the plurality of radial parts in the peripheral direction.

* * * * *